US006633613B1

United States Patent
Houlberg

(12) 
(10) Patent No.: US 6,633,613 B1
(45) Date of Patent: Oct. 14, 2003

(54) DIGITAL CIRCUIT FOR FORMATTING AND COMPRESSING RADAR VIDEO DATA

(75) Inventor: Christian L. Houlberg, Ventura, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 725 days.

(21) Appl. No.: 09/586,602

(22) Filed: Jun. 2, 2000

(51) Int. Cl.[7] .................................................. H04B 1/66
(52) U.S. Cl. .................................................. 375/240.26
(58) Field of Search ...................... 375/240.26; 341/51; 324/158.1; 342/379; 714/724

(56) References Cited

U.S. PATENT DOCUMENTS

| | | | |
|---|---|---|---|
| 5,150,048 A | * 9/1992 | McAuliffe et al. | 714/724 |
| 5,159,336 A | * 10/1992 | Rabin et al. | 341/51 |
| 5,614,818 A | * 3/1997 | El Ayat et al. | 324/158.1 |
| 5,874,917 A | * 2/1999 | Desodt et al. | 342/379 |

* cited by examiner

Primary Examiner—Chris Kelley
Assistant Examiner—Allen Wong
(74) Attorney, Agent, or Firm—David S. Kalmbaugh

(57) ABSTRACT

A digital circuit for compressing video data generated by a missile's seeker. The digital circuit includes a frame controller and a video compression engine. The frame controller generates each frame of data with each frame of data having eight subframes of one thousand eight bit words. The compression engine receives approximately sixty four scans of video data with each scan having 4000 samples of video data. The compression engine receives the first scan of video data from the missile's seeker and then writes the scan of video data to an external memory which is a static RAM. The compression engine adds each successive scan of video data to the previous scans to provide a total scan value for each sample of video data. The compression engine obtains an average value for each sample of video data by performing a binary shift. The compression engine also provides a peak value for each of the 4000 samples of video data. The frame controller then generates the eight subframes of video data with alternating bytes comprising peak video data and average video data. The frame controller also provides three bytes of frame sync, one byte of sub-frame identification and one byte representing frame count. One byte representing scan count for each subframe is generated by the compression engine.

20 Claims, 22 Drawing Sheets

FIG. 12A
FIG. 12B
FIG. 12C
FIG. 12D
FIG. 12E
FIG. 12F
FIG. 12G
FIG. 12H
FIG. 12I
FIG. 12J
FIG. 12K

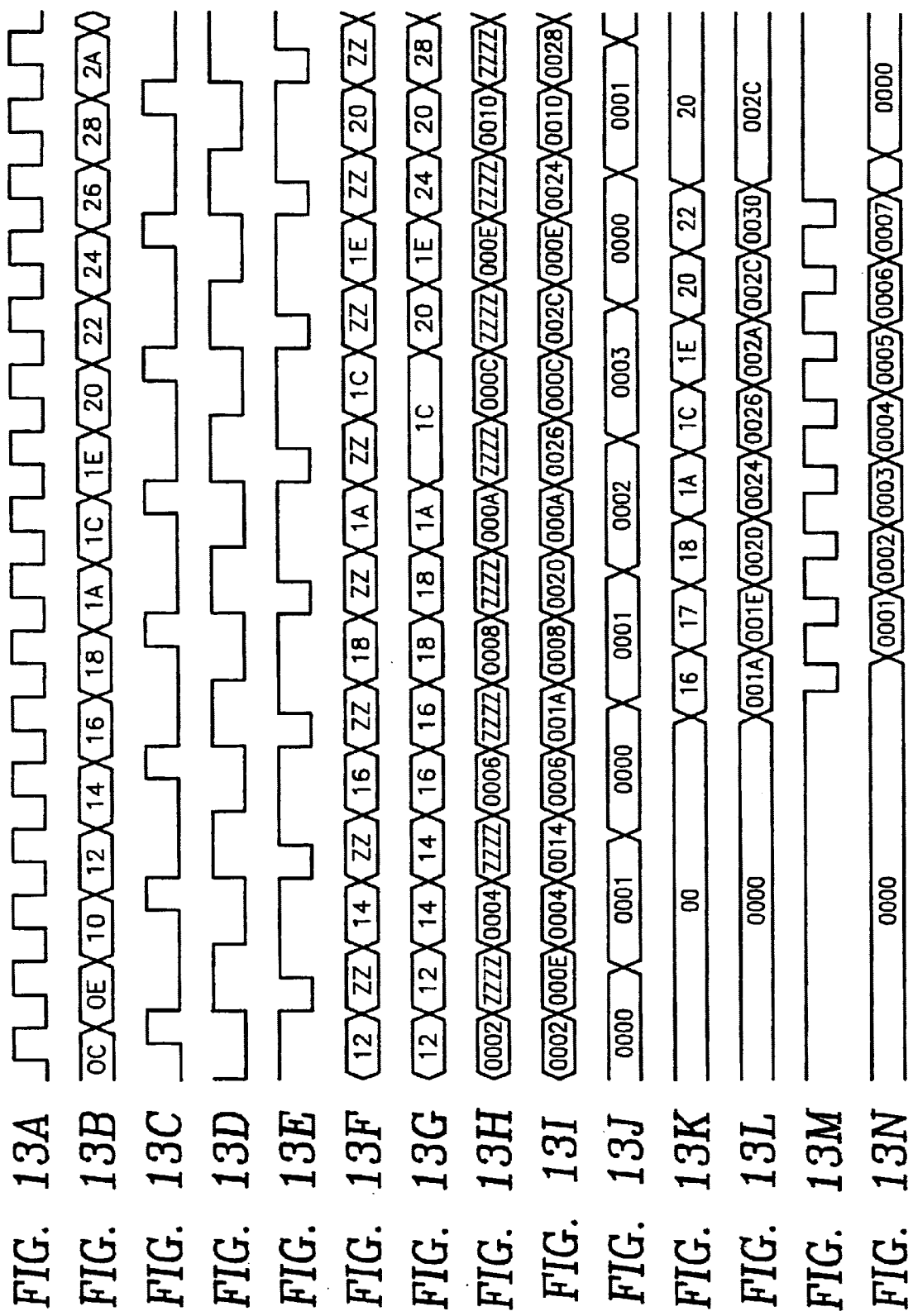

DIGITAL CIRCUIT FOR FORMATTING AND COMPRESSING RADAR VIDEO DATA

BACKGROUND OF THE INVENTION

1. Field of the Invention

The present invention relates generally to a digital circuit for formatting and compressing video data. More particularly, the present invention relates to a digital circuit which includes a data compression engine for compressing digital video data received from a missile in flight and a frame formatter for formatting the compressed video data prior to transmission from the missile.

2. Description of the Prior Art

Radar video data received from a missile in flight is a wide bandwidth signal that exceeds the bandwidth limitations of the missile's telemeter, which is the signal transmitter for the missile. Typically, a signal of this type has a bandwidth in the vicinity of 20 megahertz. To properly analyze the operation of a missile which transmits radar video data, every radar scan needs to be transmitted by the missile to a receiving station.

In addition, the receiving station generally does not have the capability of handling signals which have a bandwidth in the vicinity of 20 megahertz.

Further, for military applications there is generally a requirement that the radar video data be encrypted which means the radar video data must be digitized. Employing a digital resolution of at least six bits increases the bandwidth requirements to at least 120 megahertz. This is far beyond the capabilities of any receiving station currently in use.

Currently, there are no known technologies which will accurately and completely transmit all the radar video data captured by a missile in flight. Technologies previously considered to reduce the bandwidth of the signal transmitted by a missile include scan skipping which sends out one out of every ten radar scans, scan averaging and lossy compressions which are compressions greater than four to one. These technologies for transmitting radar video data are not acceptable to the military which requires a complete and accurate transmission of the data in order to analyze the missile's performance during a test flight.

SUMMERY OF THE INVENTION

The present invention overcomes some of the difficulties of the prior art including those mentioned above in that it comprises a highly effective and efficient digital circuit for compressing video data generated by a missile's seeker prior to the missile's telemeter transmitting the compressed data to a remotely located ground station. The digital circuit includes a frame controller and data compression circuit or video compression engine. The frame controller generates each frame of data with each frame of data comprising eight subframes. Each subframe generated by the frame controller has a length of one thousand eight bit words.

The compression engine receives approximately sixty four scans of video data from the missile's seeker with each scan having 4000 samples of video data. The compression engine receives the first scan of video data from the missile's seeker and then writes the scan of video data to an external memory which is a static RAM. The compression engine adds each successive scan of video data to the previous scans to provide a total scan value for each sample of video data. The compression engine then processes the total scan value of each sample of video data to provide an average value for each sample of video data. The average value for each sample of video data is obtained by performing a binary shift which shifts the data six places to the right.

The compression engine also provides a peak value for each of the 4000 samples of video data. The compression engine compares each of the 4000 samples of video data with a corresponding sample of video data stored in the external memory and then writes the sample of video data having the largest value into the external memory.

The frame controller then generates the eight subframes of video data with alternating eight bit words comprising peak video data and average video data. The frame controller also provides control data comprising three bytes of frame sync, one byte of sub-frame identification and one byte representing frame count. One byte representing scan count for each subframe of video data is generated by the compression engine.

BRIEF DESCRIPTION OF THE DRAWINGS

FIGS. 12A–12K illustrate various waveforms occurring at some of the inputs and outputs of the frame controller of FIGS. 12A–12C; and FIGS. 13A–13N illustrate various waveforms occurring at some of the inputs and outputs of the data compression circuit of FIGS. 6A–6C.

DETAILED DESCRIPTION OF THE PREFERRED EMBODIMENT

Figure 6A:
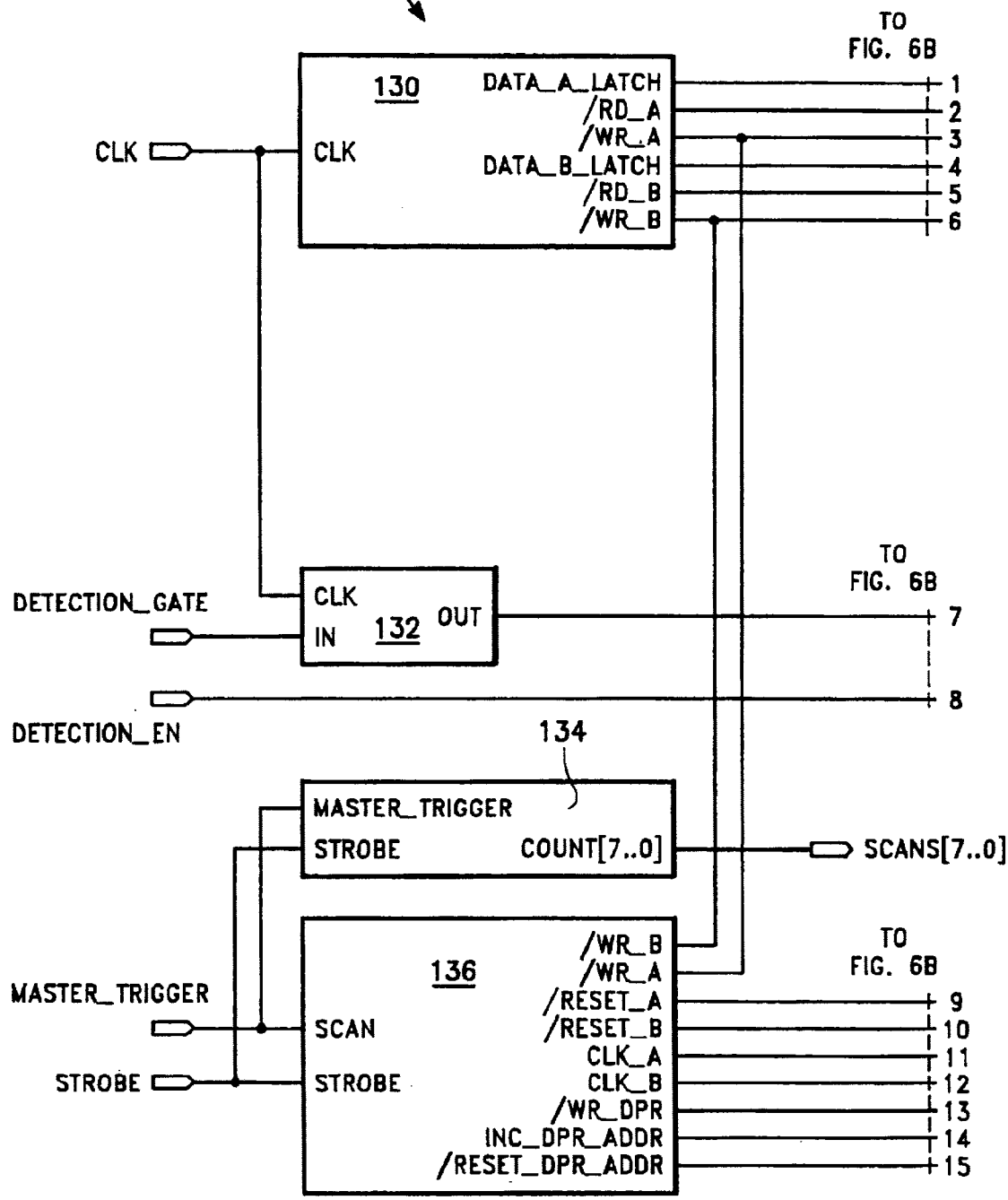
FIGS. 6A–6C are a detailed logic diagram of the data compression circuit for the digital circuit of FIG. 1.
Figure 6B:
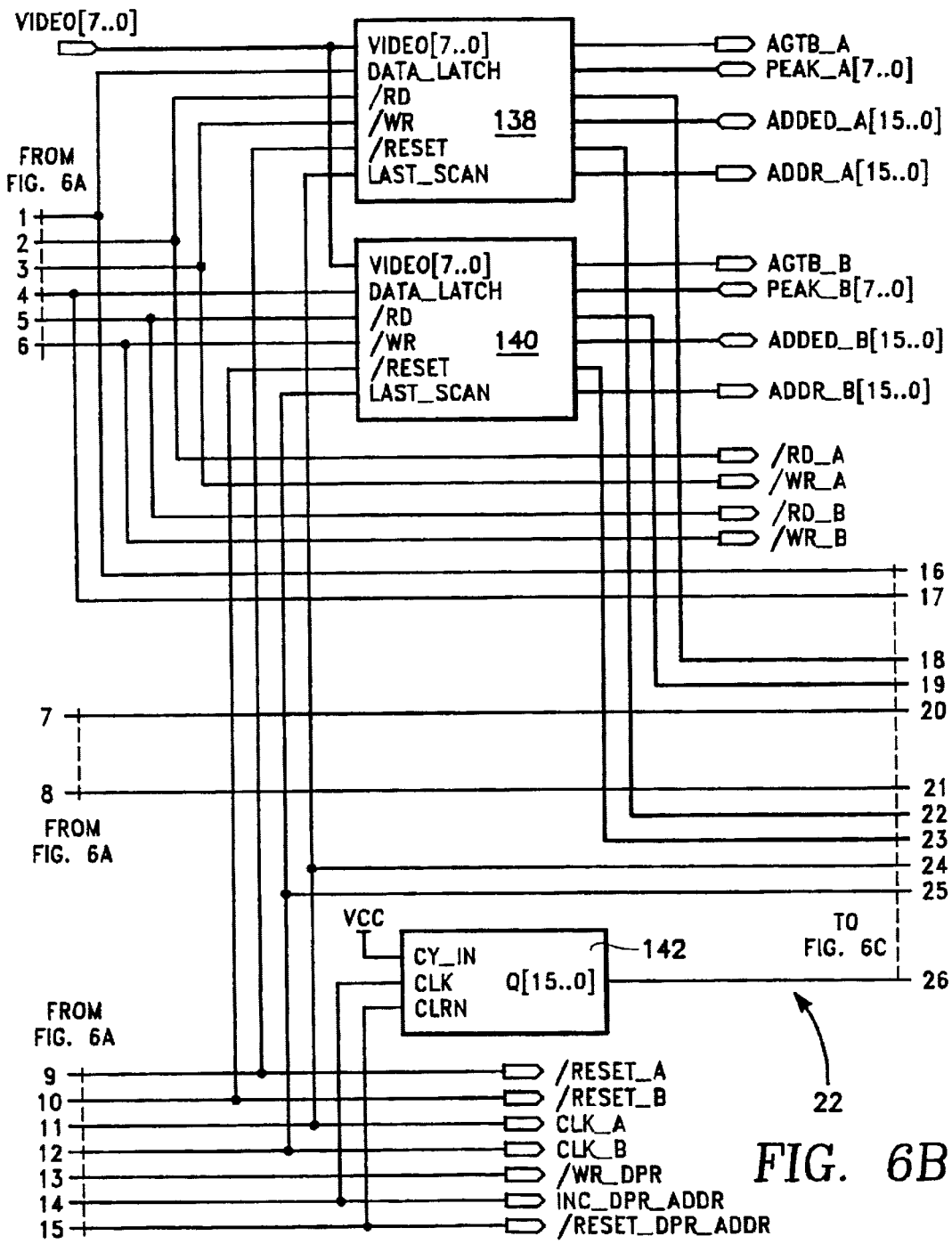
Figure 6C:
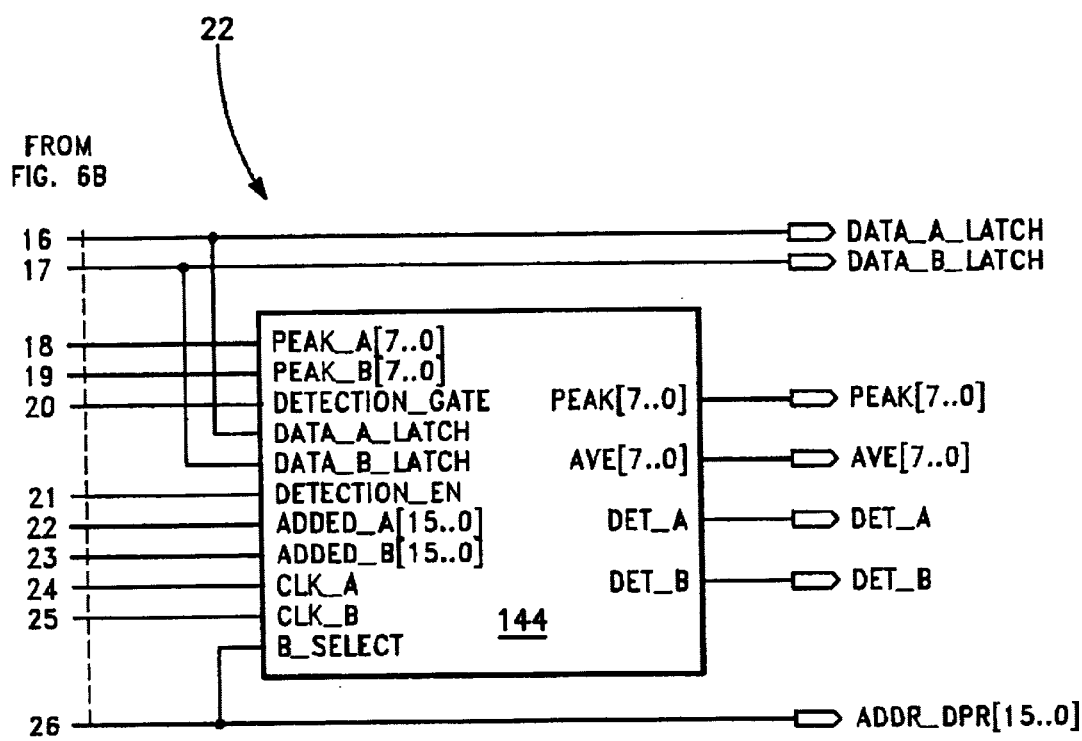

Referring first to FIGS. 1 and 2A–2C, the digital circuit for compressing radar video data and then formatting the compressed radar video data comprising the present invention includes a frame controller 20 (illustrated in FIGS. 2A–2C) and a data compression circuit 22 (illustrated in FIGS. 6A–6C). Each frame of video data generated by the frame controller 20 of the digital circuit of FIG. 1 includes eight subframes with each subframe having one thousand bytes.

Frame controller 20 comprises a frame formatter 24 which generates the format for the frame. The format for the frame includes the size of a data word which is eight bits for one byte, the size of each subframe, and the size of the frame. Frame formatter 24 provides a NON_VIDEO signal which is supplied through an OR gate 26 to the D input of a Flip-Flop 30. The NON_VIDEO signal is active when there is non-video data which includes the frame sync, the sub-frame identification and the frame count. The PCM (pulse code modulated) clock signal of FIG. 12A continuously clocks the NON_VIDEO signal through Flip-Flop 30 to its Q output.

When non-video data is not being provided by frame formatter 24, frame formatter 24 enables the VIDEO_ENABLE signal which is supplied to AND gate 28. This enables AND gate 28 allowing video data provided by parallel to serial shift register 32 to pass through AND gate 28 and OR gate 26 to the D input of Flip-Flop 30. The PCM clock signal of FIG. 12A continuously clocks the video data through Flip-Flop 30 to its Q output. The PCM_DATA signal appearing at the Q output of Flip-flop 30 is illustrated in FIG. 12G. The frame controller 20 generates the eight subframes of video data with alternating eight bit words comprising peak video data and average video data.

At this time it should be noted that the PCM CLK signal of FIG. 12A is a five megahertz clock signal. It should also be noted that /RESET signal, which is a power up reset, is illustrated in FIG. 12B and the eight bit parallel data input to shift register 32 is illustrated in FIG. 12C.

Frame formatter 24 generates a VIDEO_LDN signal which is supplied the STLD input of shift register 32. While the VIDEO_LDN signal is low eight bit parallel video data is presented to the A-H inputs of register 32, allowing the next low to high transition of the PCM CLK signal of FIG. 12A to latch or load the data into shift register 32. When the VIDEO_LDN signal is high serial video data is shifted out of register 32 through the QH output of register 32 by the PCM CLK signal of FIG. 12A.

Figure 1:
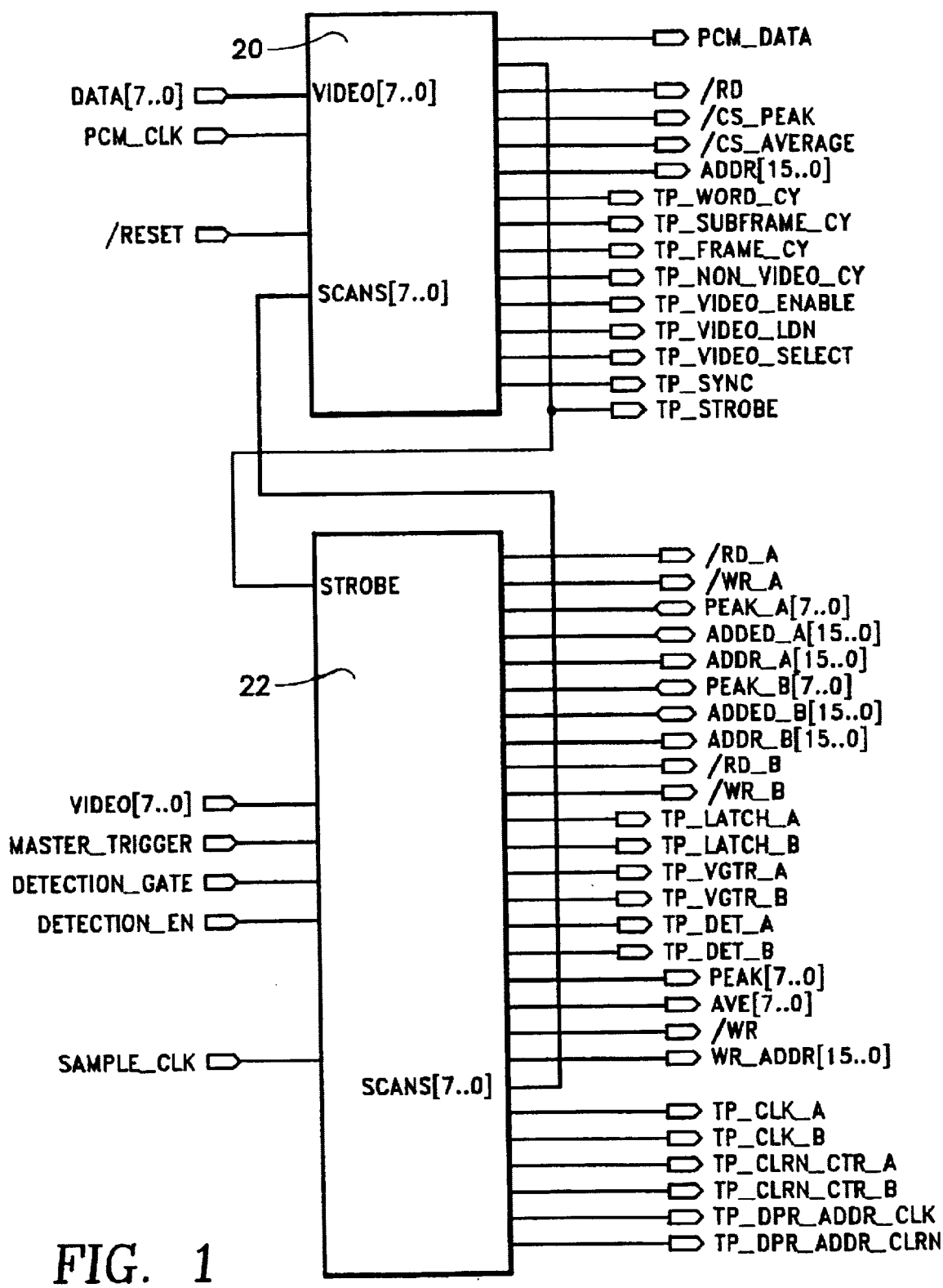
FIG. 1 is an electrical block diagram of the digital circuit for compressing and then formatting radar video data which constitutes the present invention.
Figure 2A:
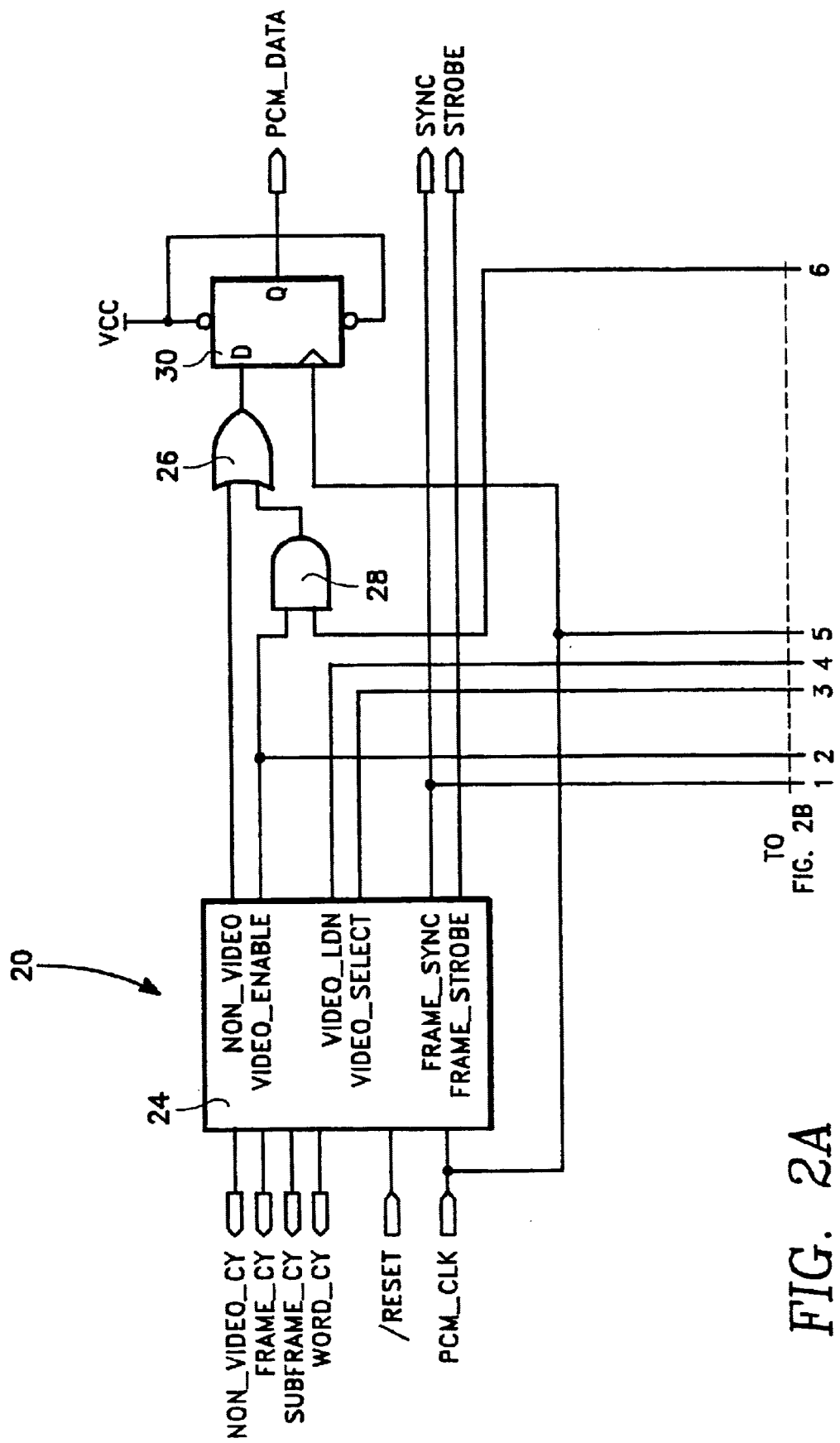
FIGS. 2A–2C are a detailed logic diagram of the frame controller for the digital circuit of FIG. 1.
Figure 2B:
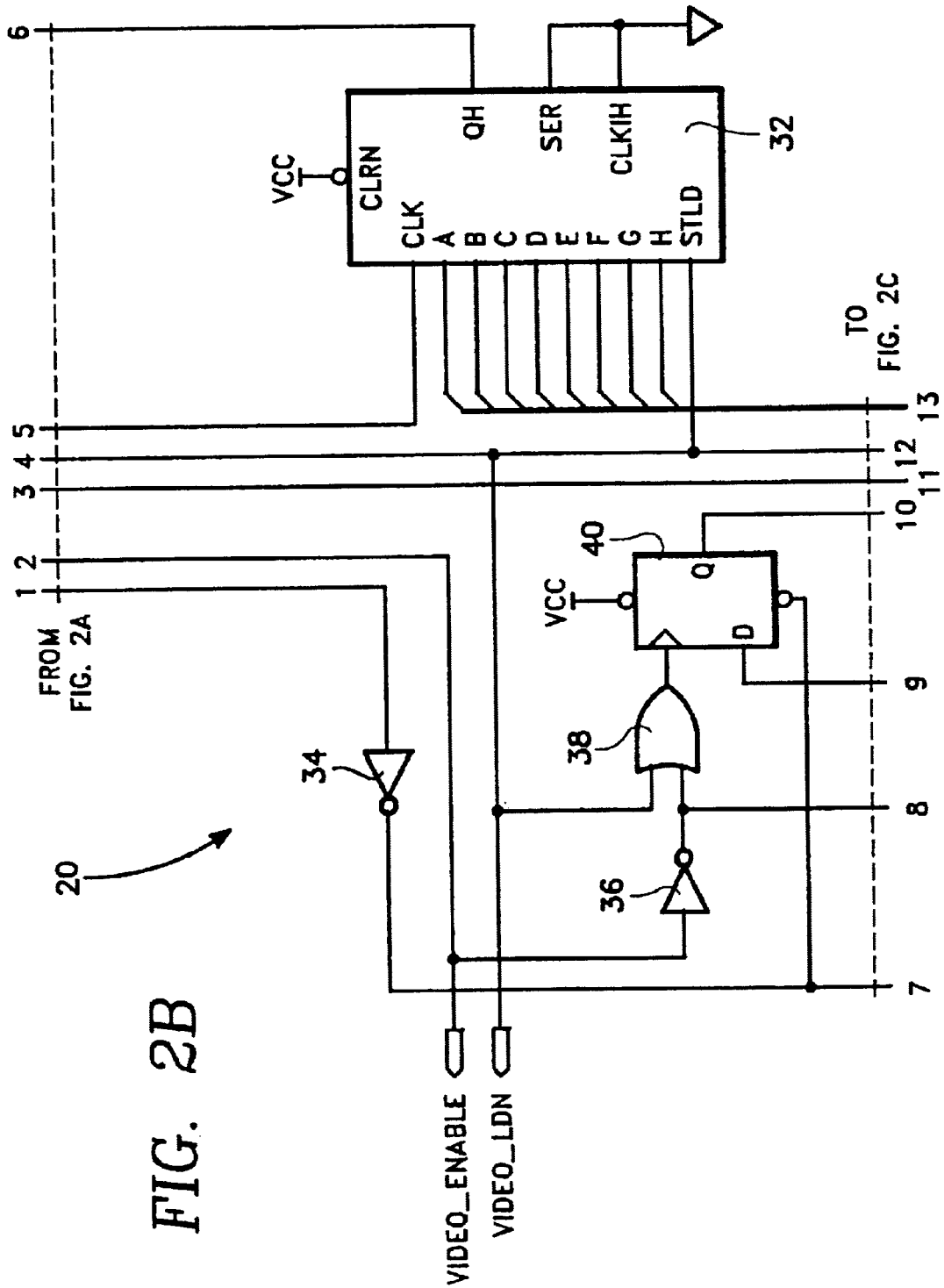
Figure 2C:
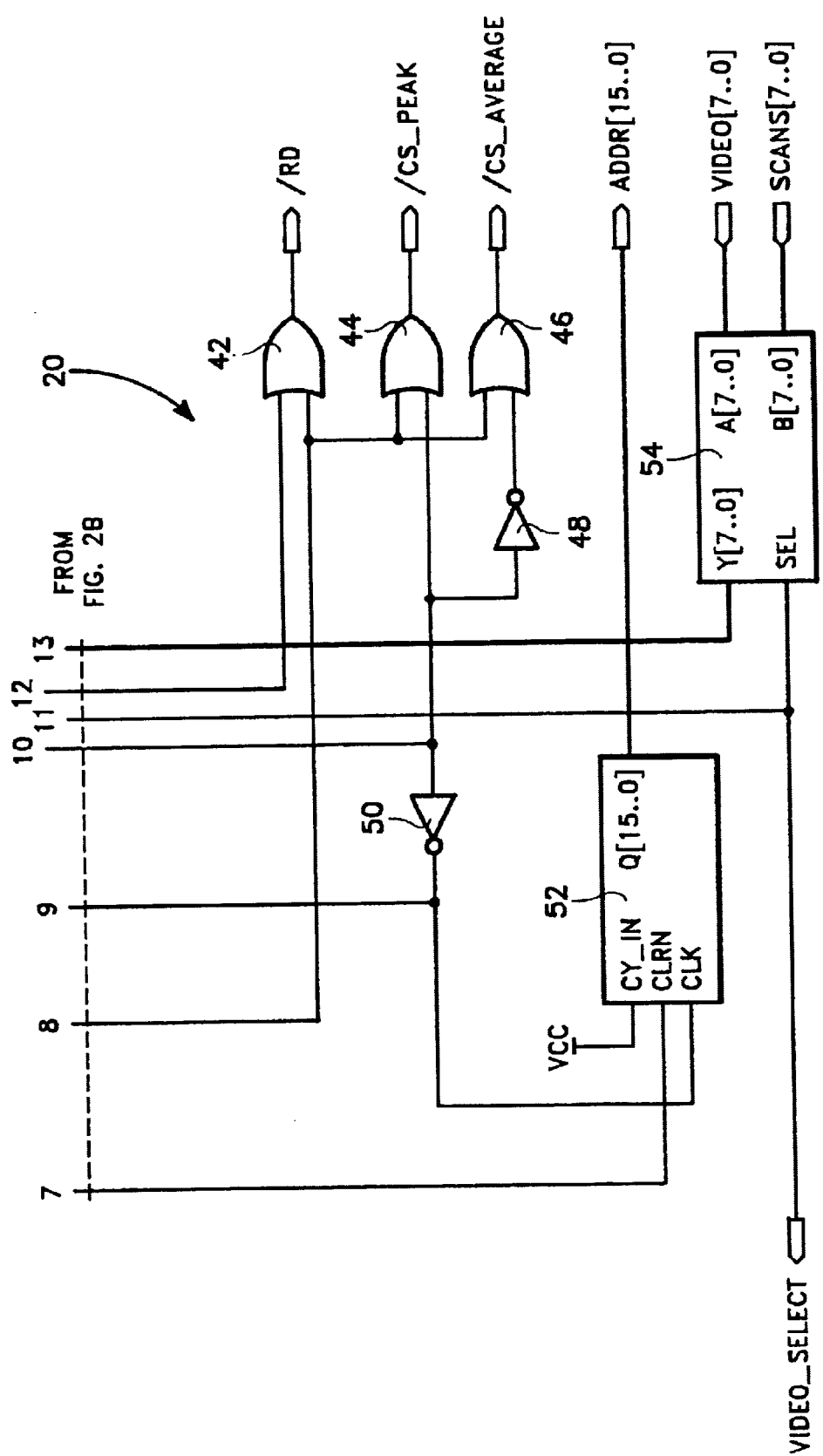
Figure 3A:
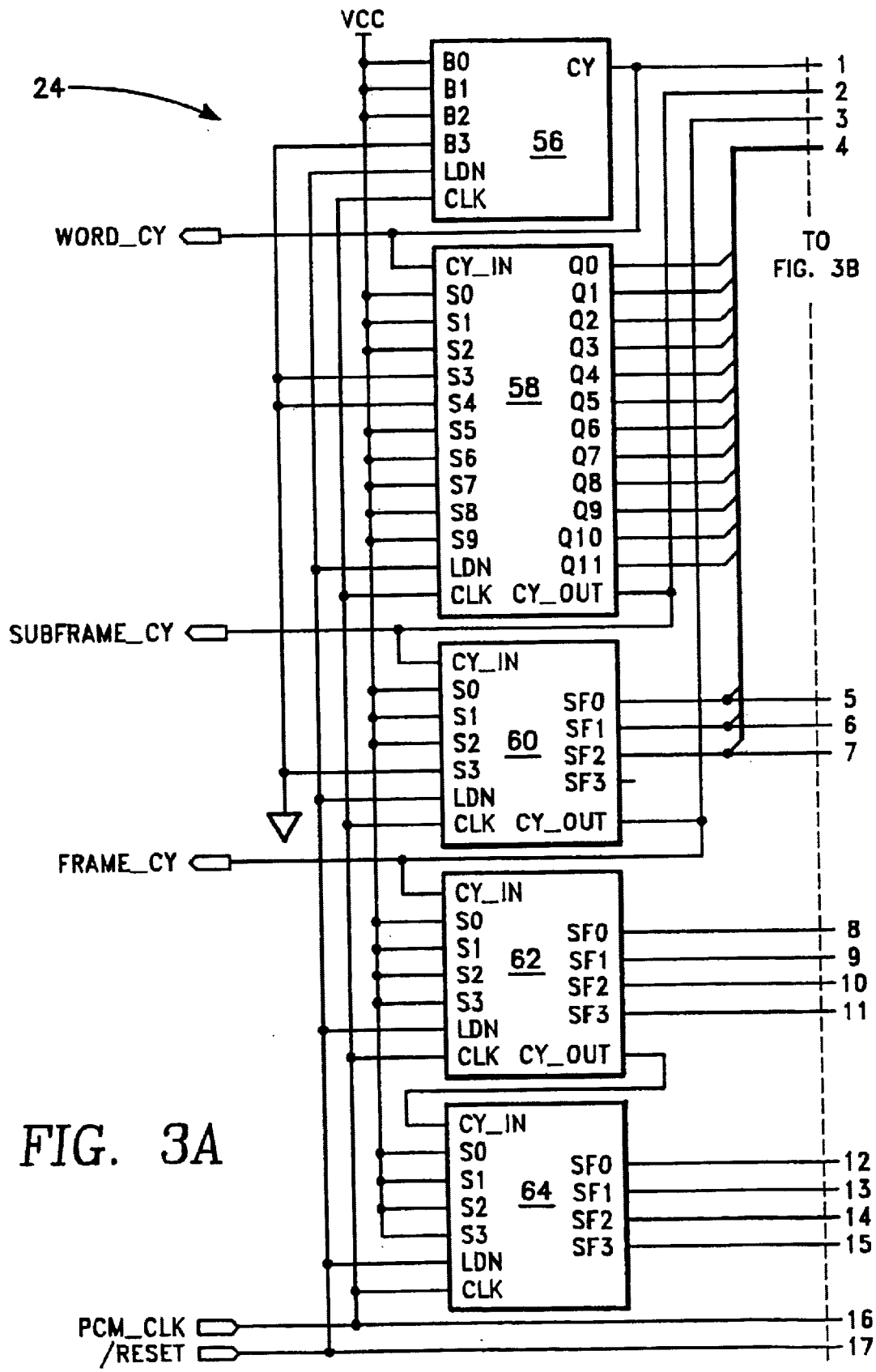
FIGS. 3A–3C are a detailed logic diagram of the frame formatter for the frame controller of FIG. 2A.
Figure 3B:
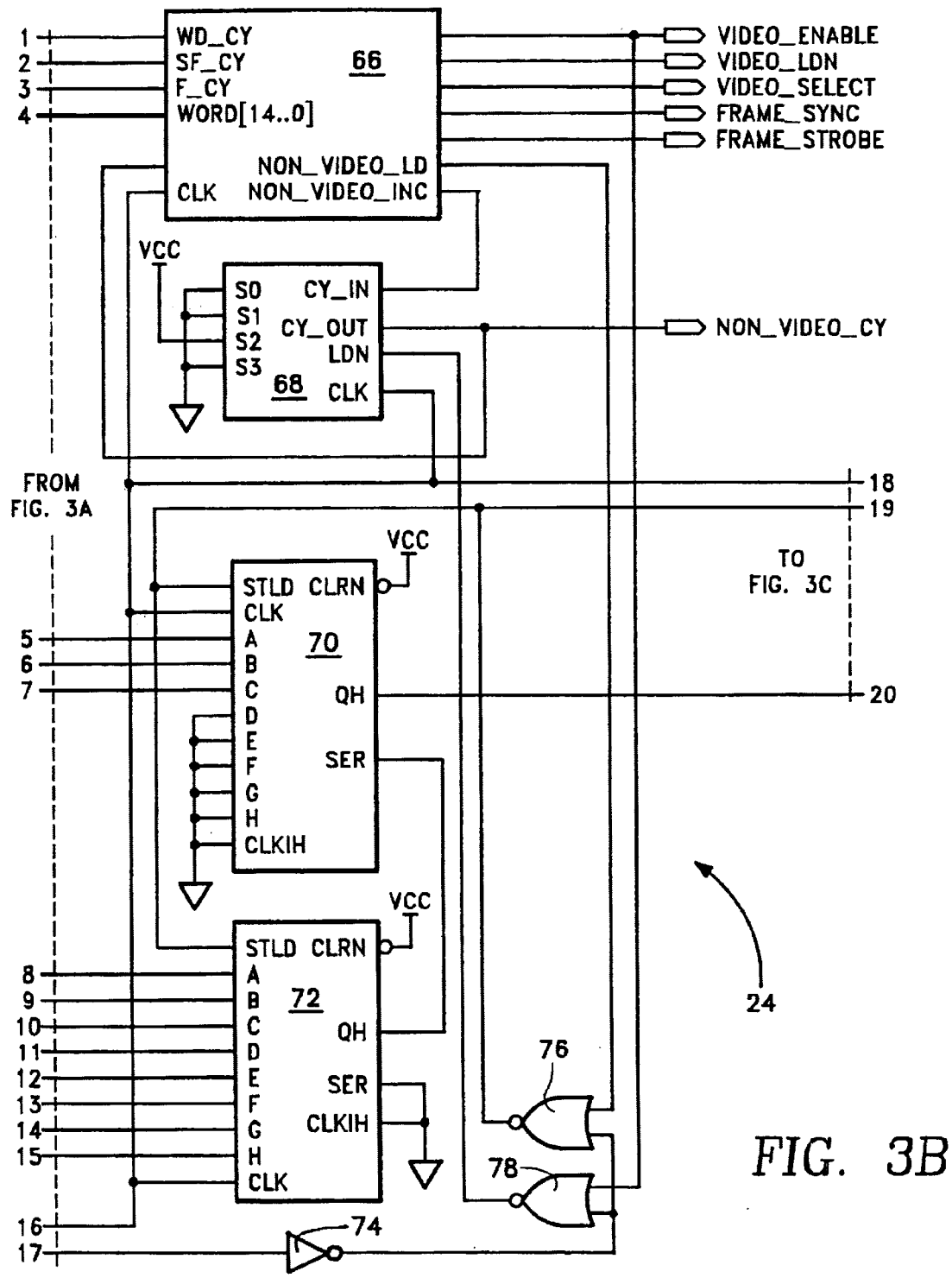
Figure 3C:
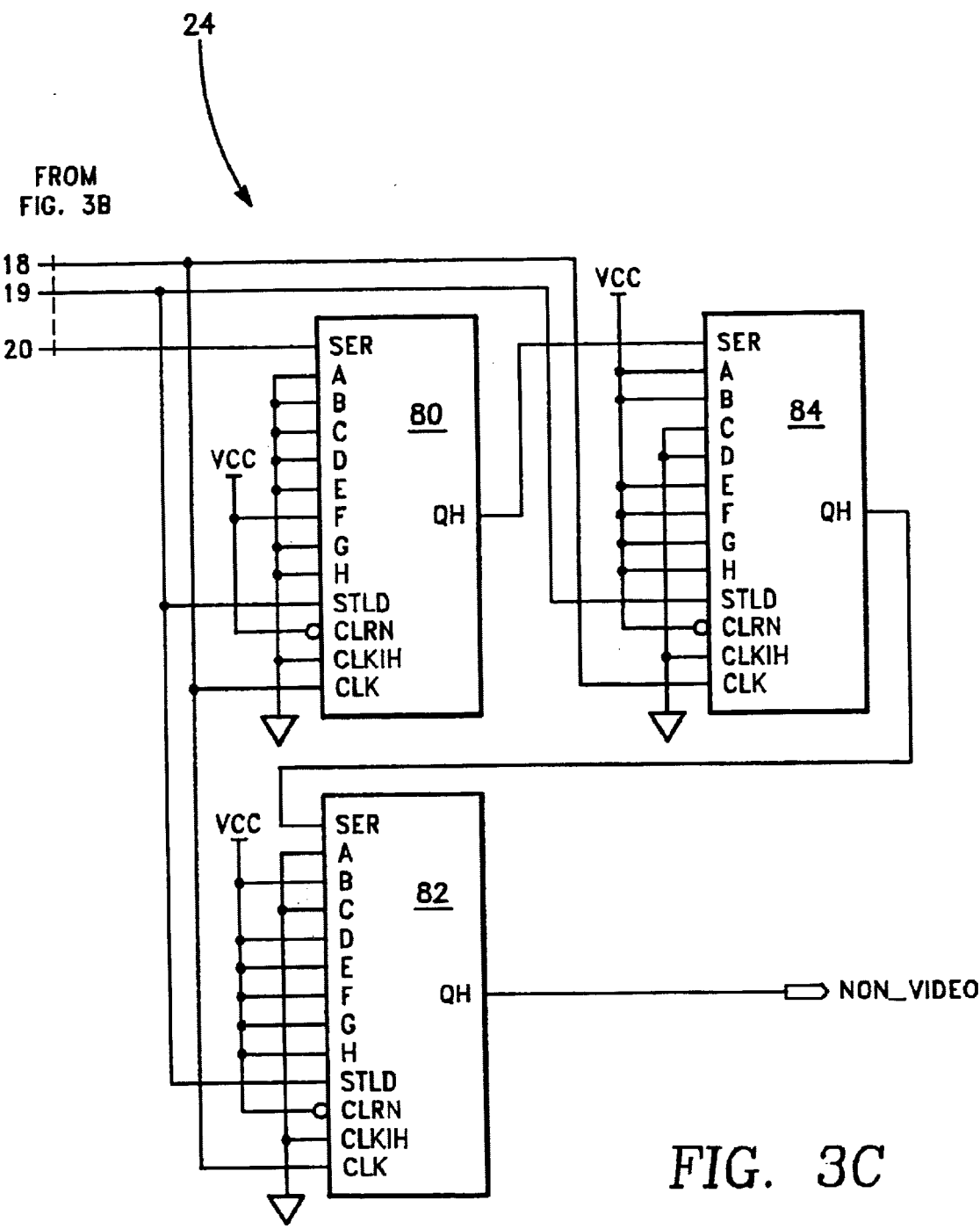

At this time it should be noted that the digital circuit of FIG. 1 operates in a synchronous manner.

Frame formatter 24 generates a VIDEO_SELECT signal (FIG. 12E) which is supplied to the SEL input of a 2×8 multiplexer 54. Eight lines of video data are supplied to the A[7 . . . 0] input of multiplexer 54, while eight lines of scan count are supplied to the B[7 . . . 0] input of multiplexer 54. When the SEL input is high the signal appearing at the A[7 . . . 0] input of multiplexer 54 is routed to the Y[7 . . . 0] output of multiplexer 54. When the SEL input is low the signal appearing at the B[7 . . . 0] input of multiplexer 54 is routed to the Y[7 . . . 0] output of multiplexer 54. As shown in FIG. 12E, the VIDEO_SELECT signal is low for only eight clock cycles for each subframe. The scan count is generally sixty four and represents the number of scans that have had the compression algorithm applied.

Frame formatter 24 generates a FRAME_SYNC signal (FIG. 12F) and a FRAME_STROBE signal. The FRAME_SYNC signal of FIG. 12F is a pulse signal which occurs when counters within formatter 24 count the eight thousand bytes that comprise a frame. The FRAME_STROBE signal is also a pulse signal which occurs once every frame before the last scan of a frame, that is the FRAME_STROBE signal generally occurs before scan number 64 of a frame.

It should be noted that the FRAME_STROBE signal may occur before, for example, scan number 63 if scan number 63 is the last scan of a frame. The FRAME_STROBE signal occurs 124 bytes before the FRAME_SYNC signal (FIG. 12F) to allow scan data from the next scan to be written into an external dual port RAM without colliding with the data being read out of the dual port RAM by frame controller 20.

The outputs NON_VIDEO_CY, FRAME_CY, SUBFRAME_CY and WORD_CY from frame controller 24 are test points.

The /RD, /CS_PEAK and /CS_AVERAGE are outputs connected to a pair of external dual port RAMs. The VIDEO_ENABLE signal passes through an inverter 36, which inverts the signal and to an OR gate 38 enabling OR gate 38. The output of OR gate 38 is connected to the clock input of Flip-Flop 40. When OR gate 38 is enabled, the VIDEO_LDN signal from frame formatter 24 passes through OR gate 38 to the clock input of Flip-Flop 40 clocking Flop-Flop 40 such that the output toggles from the logic zero state to the logic one state and then returns to the logic zero state. This occurs because the Q output of Flip-Flop 40 is connected through an inverter 50 to the D input of Flip-Flop 40.

Flop-Flop 40 selects between an external dual port RAM which provides for the temporary storage of peak data and an external dual port RAM which provides for the temporary storage of average data. The active low read signal occurring at the /RD output of frame controller 20 is depicted in FIG. 12H. The signal occurring at the /CS_PEAK output of frame controller 20 is depicted in FIG. 12I and is an active low signal which is used to access the dual port RAM which provides for the temporary storage of peak data. OR gates 42, 44 and 46 are enabled by the VIDEO_ENABLE signal from frame formatter 24. When the VIDEO_LDN signal transitions to a logic zero state, the output of OR gate 42 goes to the logic zero state providing an active read signal to the pair of dual port RAMS.

At the beginning of each frame, the Q output of Flip-Flop 40 is low resulting in a logic zero being supplied to OR gate 44 which, in turn, results in a logic zero at the output of OR gate 44, that is the /CS_PEAK output is active. Simultaneously, the /CS_AVERAGE output (FIG. 12J) of frame controller 20 is inactive since inverter 48 inverts the logic zero resulting in a logic one occurring at the output of OR gate 46. It should be noted that the active low read signal of FIG. 12H is supplied to both external dual port RAMS with the active low /CS_PEAK signal of FIG. 12I and the active low /CS_AVERAGE signal of FIG. 12J determining which dual port RAM is being selected to have peak data or average data read from the dual port RAM.

Addresses for the dual port RAMS are provided by an address counter 52 which provides 16 bit addresses (illustrated in FIG. 12K) through the ADDR[15 . . . 0] output of frame controller 20 to the dual port RAMs. The clock signal for address counter 52 is provided by Flip-Flop 40 through inverter 50 to the CLK input of address counter 52. It should be noted that for each address generated by address counter 52, peak data is read and then average data is read.

Referring to FIGS. 1, 3A, 3B and 3C, the PCM CLK signal of FIG. 12A is supplied to the CLK input of a bit counter 56. Bit Counter 56 is programmed to count from zero to seven and then the CY output goes active. Bit Counter 56 counts the number of bits in each word or byte which is eight bits. The active high CY output of bit counter 56 is supplied to the CY_IN input of a word counter 58. Word counter 58 is programmed to count from zero to nine hundred ninety nine for a word count of one thousand which equates to one thousand eight bit words per subframe.

The active CY_OUT output of word counter 58 is supplied to the CY_IN input of a subframe counter 60. Subframe counter 60 is programmed to count from zero to seven for a subframe count of eight which equates to eight subframes per frame. Bit counter 56, word counter 58 and subframe counter 60 generate the form of each frame.

The active CY_OUT output of subframe counter 60 is supplied to the CY_IN input of a frame counter 62 which has its CY_OUT output connected to the CY_IN input of a frame counter 64. Frame counters 62 and 64 are programmed to count from zero to two hundred fifty five. Frame counters 62 and 64 identify consecutive frames on received data. The count of 256 is used as an ID mechanism to identify consecutive frames of received data after the data has been transmitted.

Figure 4:
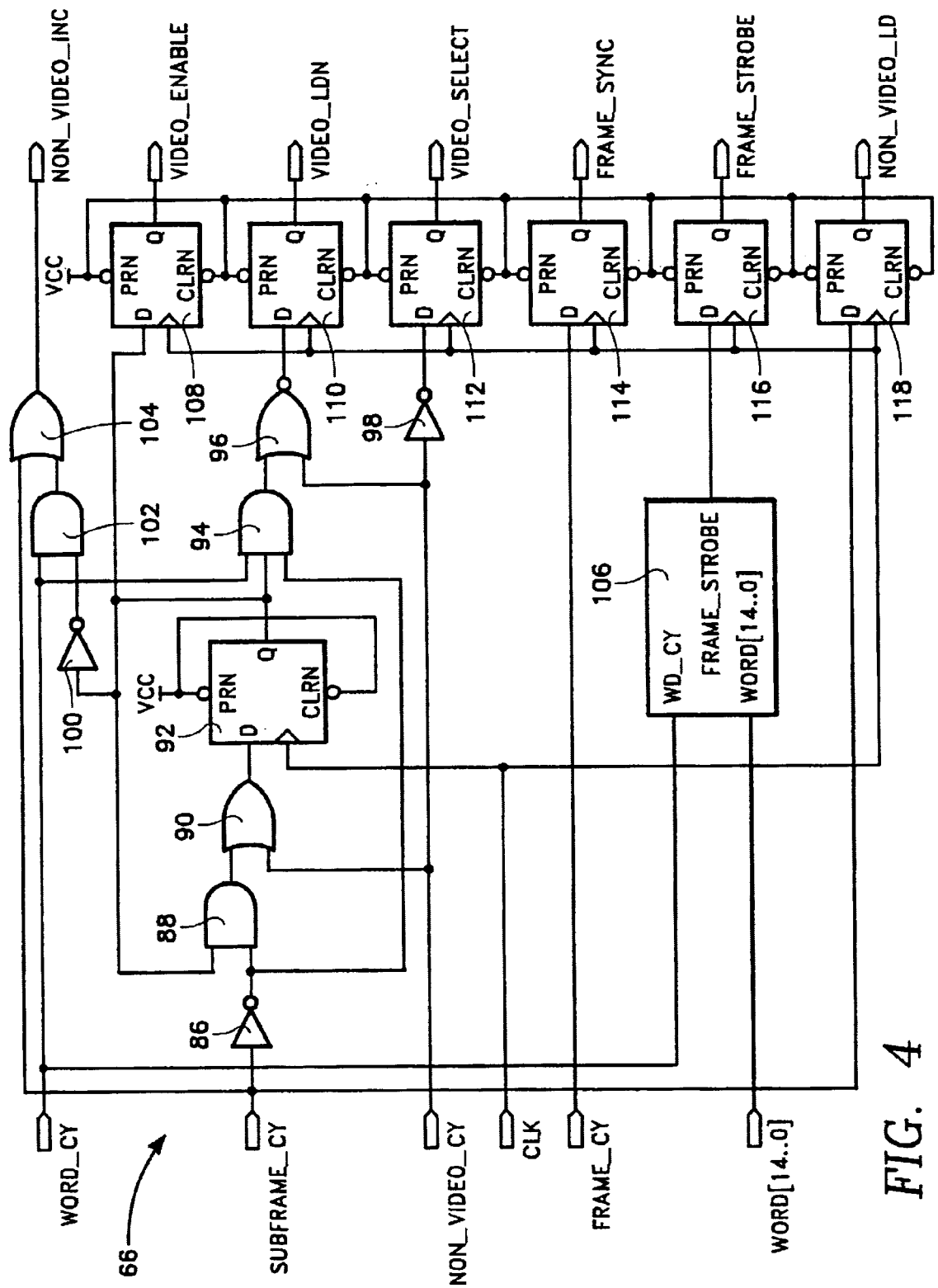
FIG. 4 is a detailed logic diagram of the word select logic circuit for the frame formatter of FIG. 3B.

The WORD_CY, SUBFRAME_CY and FRAME_CY output signals, as well as the Q0–Q11 output signals from word counter 58 and the SF0–SF2 output signals from subframe counter 60 are supplied to a word select circuit 66 which is illustrated in detail in FIG. 4. Word select circuit 66 then generates a NON_VIDEO_LOAD signal which is supplied to a NOR gate 76 resulting in a low pulse being supplied to STLD inputs of a pair of parallel to serial shift registers 70 and 72. Shift registers 70 and 72 are used to shift out the subframe ID and the frame count in a serial format. Parallel to serial shift registers 80, 82 and 84 provide the 24 bit frame sync signal or pattern. The 24 bit frame sync signal is provided first at the NON_VIDEO output of frame formatter 24 followed by the eight bit subframe ID and then the eight bit frame count. The bit pattern which comprises three eight bit words is 11111010 11110011 00100000

Frame formatter 24 also includes a non-video word counter 68 which counts the three words of the frame sync signal, the sub frame ID word and the frame count word.

Referring to FIGS. 3A, 3B, 3C and 4, when the NON_VIDEO_CY output of counter 68 goes high, a logic one passes through OR gate 90 of word select circuit 66 to the D input of Flip-Flop 92. The PCM CLK signal of FIG. 12A clocks this logic one to the Q output of Flip-Flop 92. The logic one from the Q output of Flip-Flop 92 is supplied to inverter 100 which inverts the logic one to a logic zero and then supplies the logic zero to an AND gate 102 disabling AND gate 102 which prevents the WORD_CY signal from bit counter 56 from passing through AND gate 102 and OR gate 104 to the NON_VIDEO_INC output of word select circuit 66.

When the Q output of Flip-Flop 92 transitions to a logic one, the logic one is supplied to the D input of Flip-Flop 108 and clocked through Flip-Flop 108 by the PCM CLK signal of FIG. 12A. This results in the generation of the VIDEO_ENABLE signal by word select circuit 66.

The VIDEO_LDN signal, which is an active low signal is generated whenever a logic zero appears at the D input of a Flip-Flop 110 and is clocked through Flip-Flop 110 by the PCM CLK signal of FIG. 12A. This occurs when either the NON VIDEO CY output of counter 68 is high or the output of AND gate 94 is high resulting in a logic zero at the output of NOR gate 96. For example, when NON_VIDEO_CY is high, the output of NOR gate is low. Similarly, when the three inputs to AND gate 94 are high the output of AND gate 94 is high. The three inputs to AND gate 94 are an inverted SUBFRAME_CY, the Q output of D Flip-Flop 92 which is VIDEO_ENABLE, and the WORD_CY from counter 56.

The VIDEO_SELECT signal of FIG. 12E is generated whenever the NON_VIDEO_CY from counter 68 is low. A logic zero supplied to inverter 98 is inverted by inverter 98 to a logic one then supplied to the D input of Flip-Flip 112. This logic one is clocked through Flip-Flop 112 by the PCM CLK signal of FIG. 12A to the Q output of Flip-Flop 112.

The FRAME SYNC of FIG. 12F is generated whenever a FRAME_CY is provided by subframe counter 60. The PCM CLK signal of FIG. 12A clocks the FRAME_CY through Flip-Flop 114 to the FRAME_SYNC output of word select circuit 66.

At this time it should be noted that Flip-Flops 108, 110, 112, 114, 116 and 118 are used to prevent glitches from appearing in the signals provided at the VIDEO_ENABLE, VIDEO_LDN, VIDEO_SELECT, FRAME_SYNC, FRAME_STROBE and NON_VIDEO_LD outputs of word select circuit 66.

Figure 5:
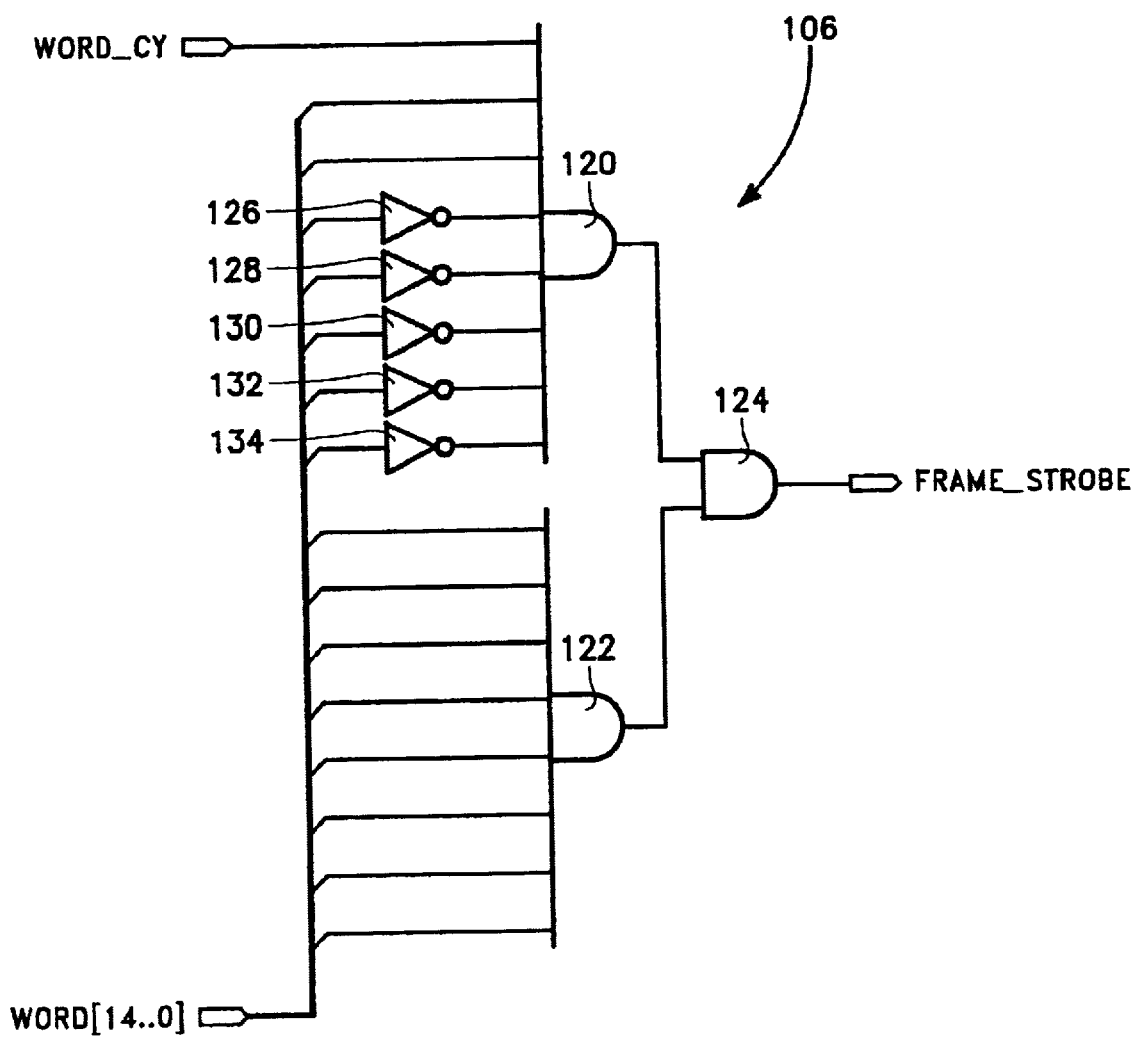
FIG. 5 is a detailed logic diagram of the frame strobe generator for the word select logic circuit of FIG. 4.

Referring to FIGS. 4 and 5, a FRAME_STROBE pulse is generated whenever frame strobe generator 106 receives a fifteen bit word count of 111 1111 1000 0011 and WORD_CY is high. This results in logic ones at the output of AND gate 120 and the output of AND gate 122. The logic ones are supplied to AND gate 124 resulting in a logic one at its output which is then clocked through Flip-Flop 116 by the PCM CLK signal of FIG. 12A to the FRAME_STROBE output of word select circuit 66. The FRAME_STROBE output of word select circuit 66 transitions to an active state at a count of 124 counts before the end of a subframe.

The NON_VIDEO_LD signal is generated by clocking SUBFRAME_CY through Flip-Flop 118 to the NON_VIDEO_LD output of word select circuit 66.

Referring now to FIGS. 1, 6A, 6B and 6C, data compression circuit 22, circuit 22 inputs video data from an analog to digital converter and then stores the video data in a static RAM which is a temporary storage device. There are a pair of static RAMS, one for storage of peak data and another for the storage of average data. It should be noted that there are 4000 samples of peak data and 4000 samples of average data taken during a scan. The sampling rate is twenty megasamples per second.

Scan zero, which is the first scan is read into data compression circuit 22 and then written directly into the static RAMS. Every consecutive sample of scan one data is compared with the corresponding scan zero data sample to determine which sample has a larger value and then the larger value is stored in the static RAM for peak value data. This static RAM for storage of peak value data has a storage capacity of 4000 bytes.

For average value data, the static RAM has a storage capacity of 4000 sixteen bit locations. For average value data, for example, each data sample from scan zero is added to a corresponding data sample from scan one. Average value data is a cumulative sum. The reason for the sixteen bit or two byte wide locations in static RAM is that samples may comprise eight bits of logic ones.

The clock signal of FIG. 13A is supplied to the CLK input of a pipe controller 130. The clock signal of FIG. 13A is a twenty megahertz signal which is the sampling rate of the analog to digital converter for the video data. Pipe controller 130 generates two sets of signals to accommodate two static RAMs for processing peak data and two static RAMS for processing average data since the static RAMs operate at slower speed than the twenty megahertz sampling rate.

Figure 7:
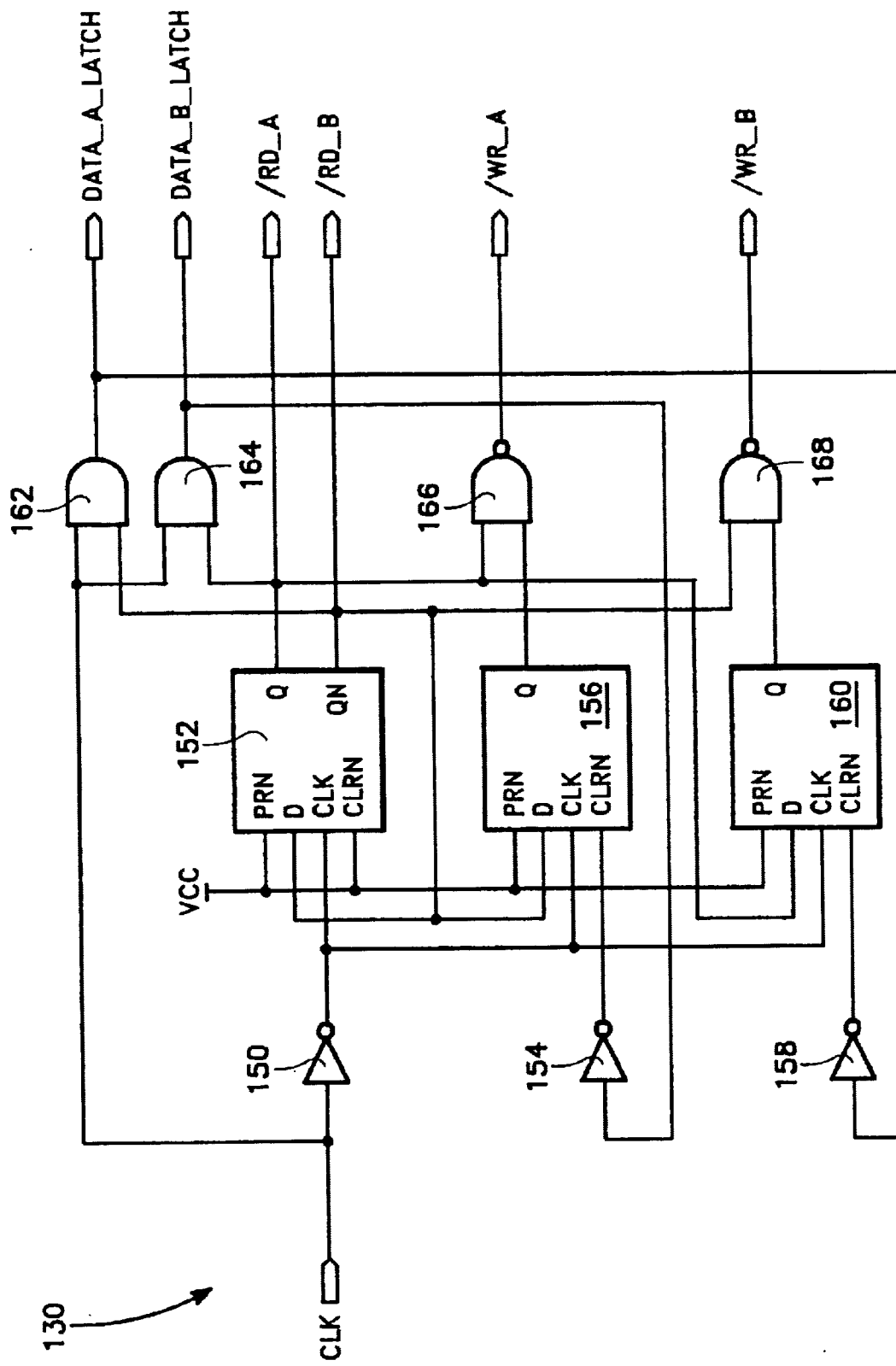
FIG. 7 is a detailed logic diagram of the pipe controller for the data compression circuit of FIG. 6A.
Figure 8A:
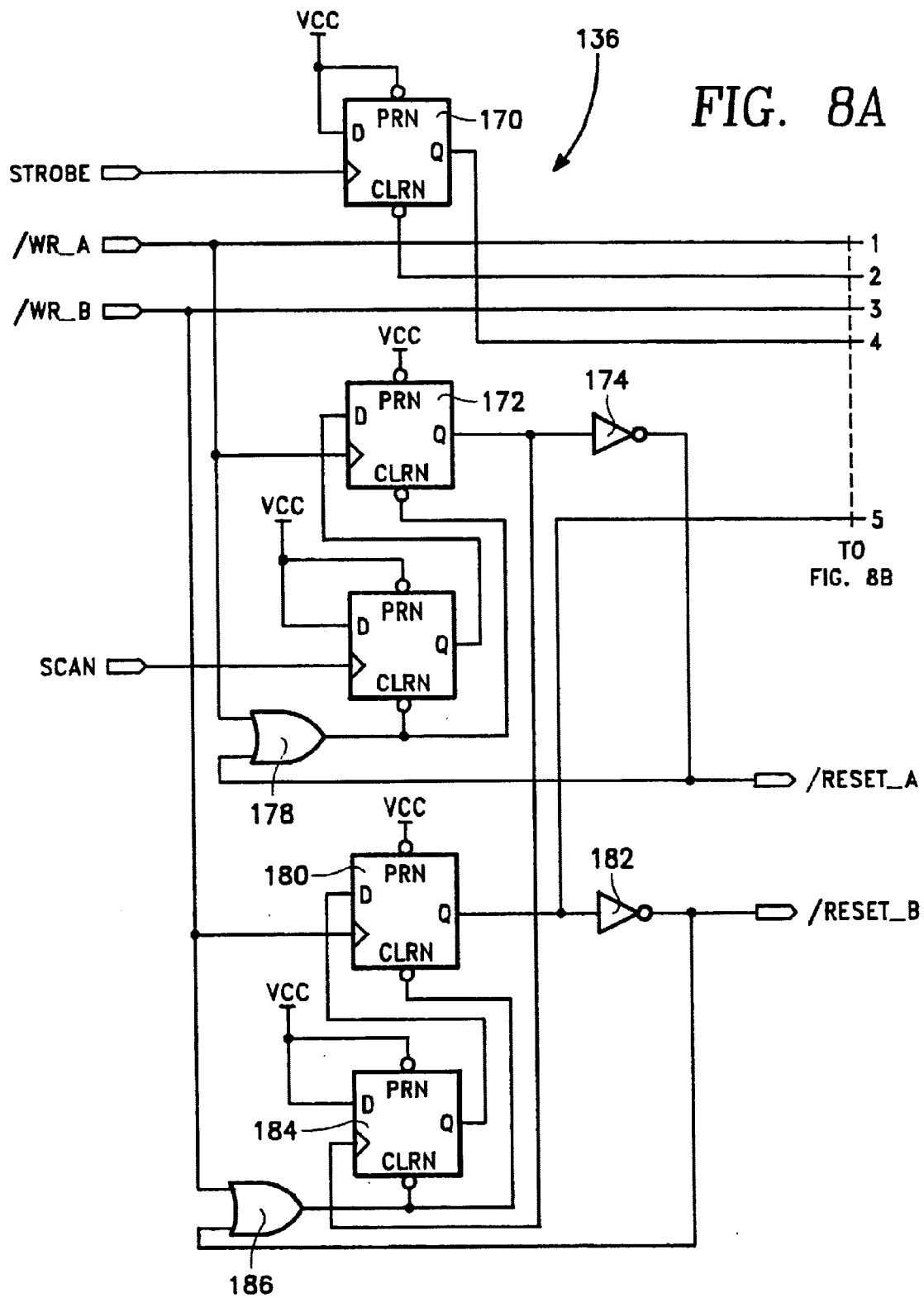
FIGS. 8A–8B are a detailed logic diagram of the output controller for the data compression circuit of FIG. 6A.
Figure 8B:
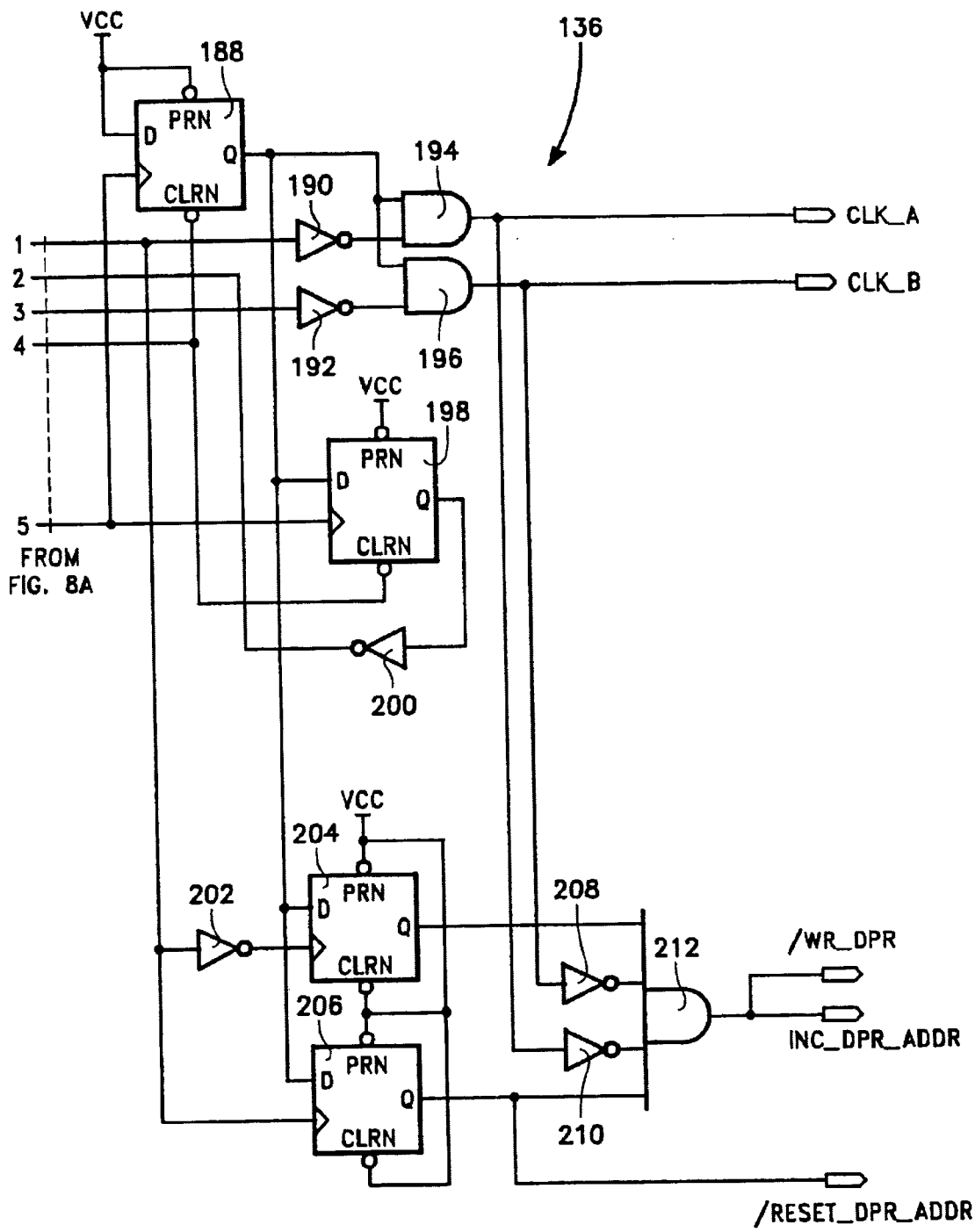
Figure 9:
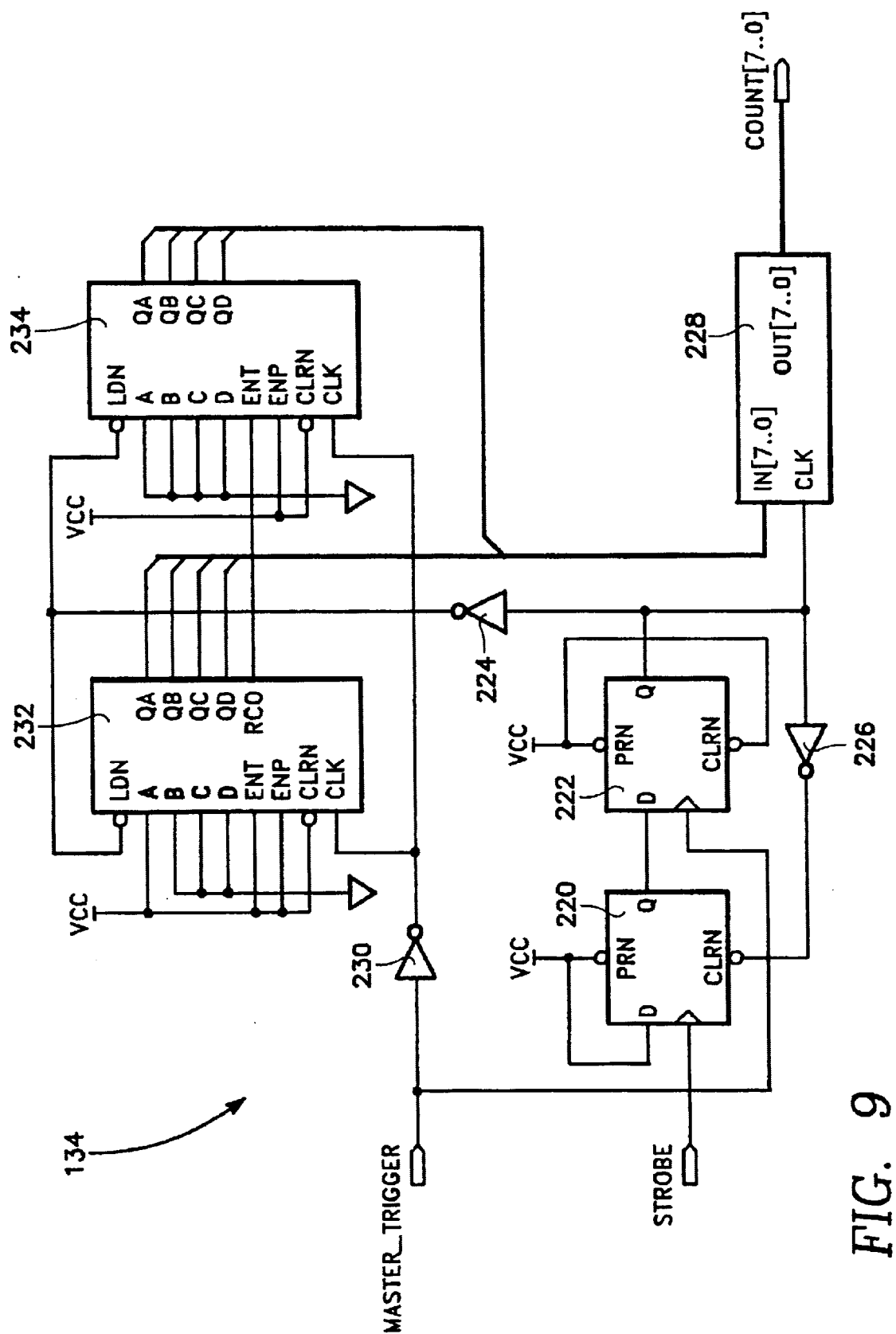
FIG. 9 is a detailed logic diagram of the scan counter for the data compression circuit of FIG. 6A.
Figure 10A:
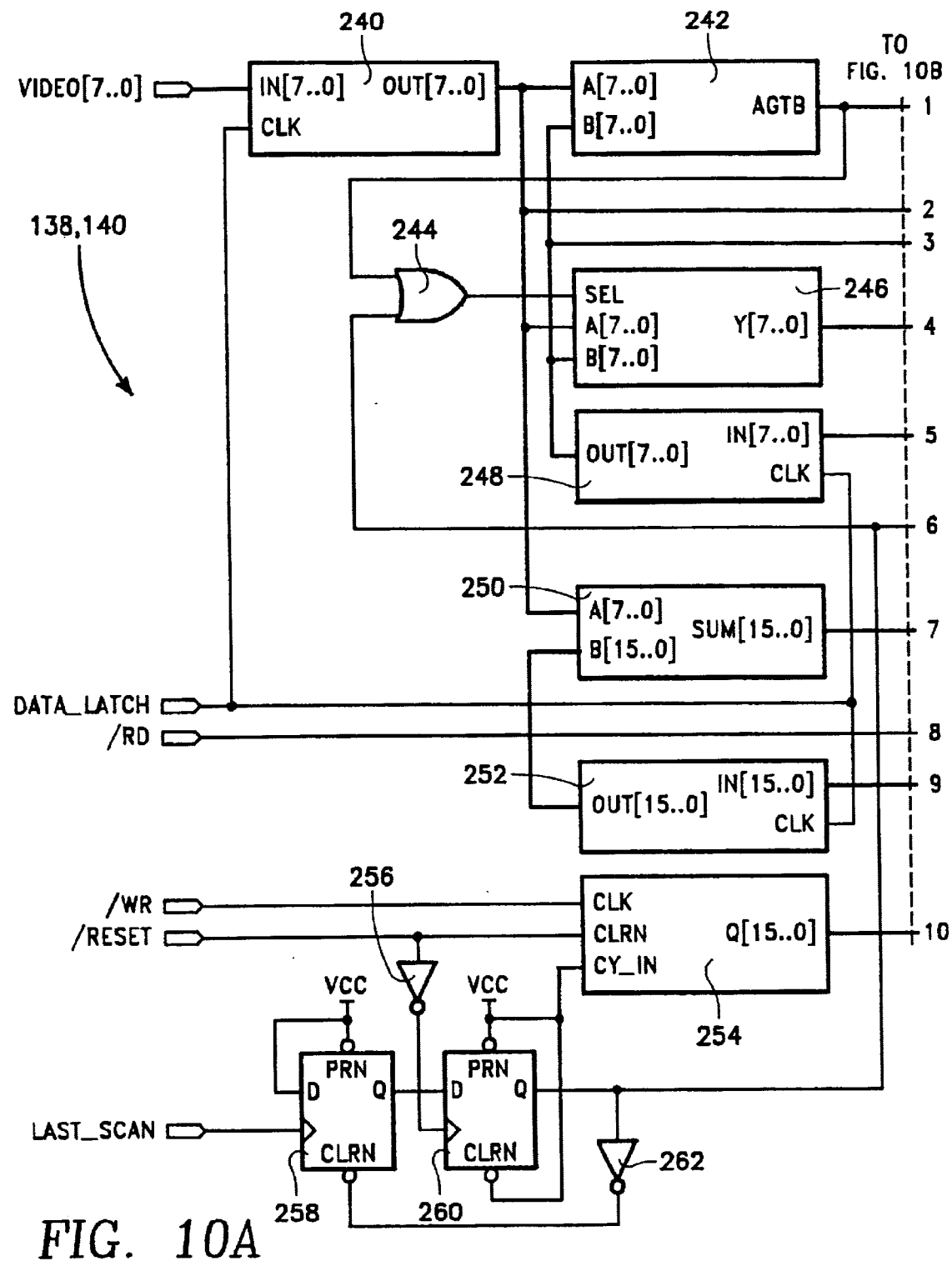
FIGS. 10A–10B is a detailed logic diagram of the data crunch circuit for the data compression circuit of FIG. 6B.
Figure 10B:
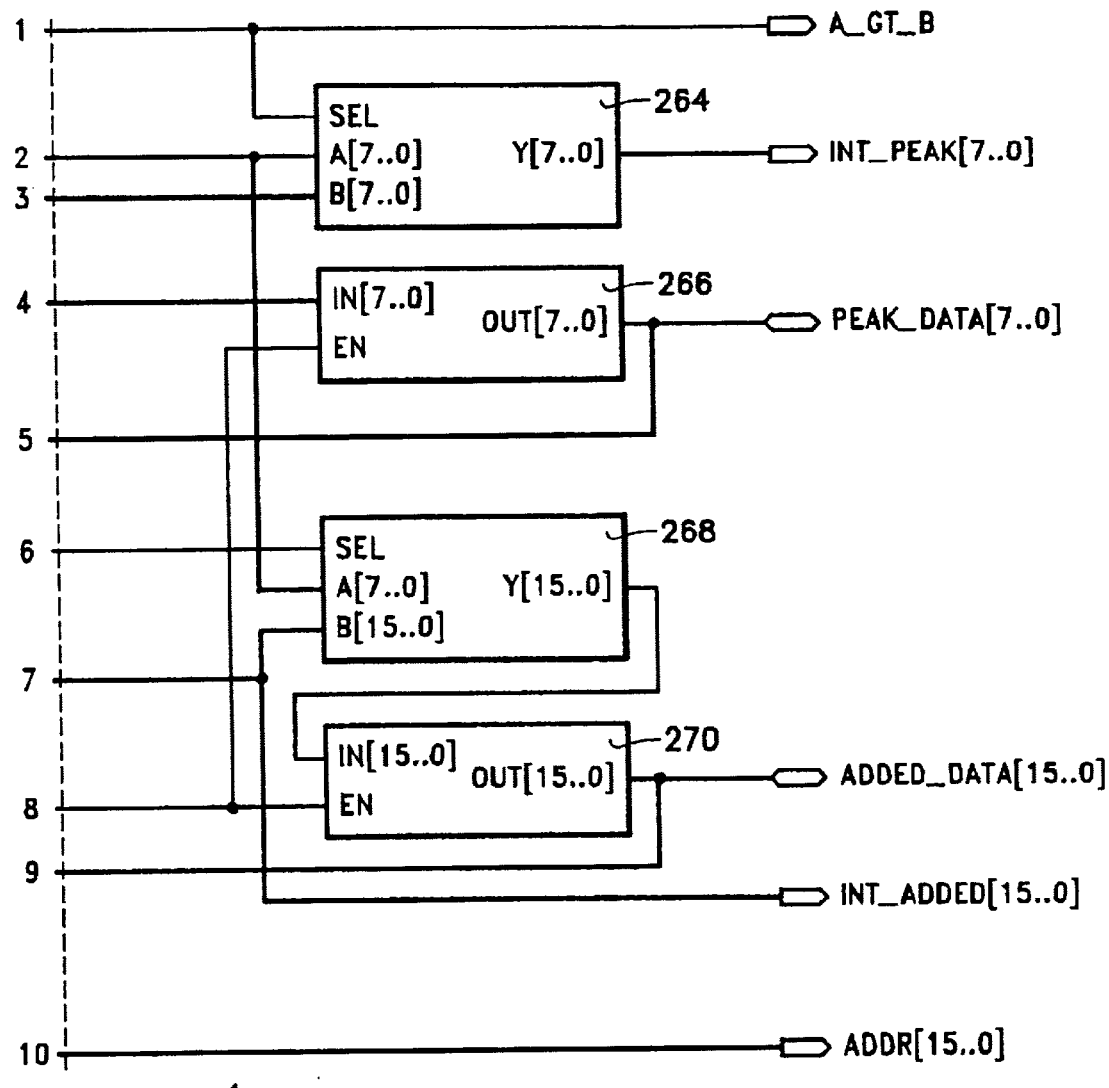

Referring to FIGS. 6A and 7, the clock signal of FIG. 13A passes through an inverter 150 to a Flip-Flop 152 which generates the read signal of FIG. 13D at the /RD_A output of pipe controller 130 and a second read signal at the /RD_B output of pipe controller 130. It should be noted that the two read signals are one hundred eighty degrees out of phase from one another.

Two Flip-Flops 156 and 160 are required to generate the write signals for the static RAMs because of timing constraints. The write signal of FIG. 13E transitions to an active state or logic zero state immediately after the read signal of FIG. 13D transitions to an inactive state. The write signal appearing at the /WR_B output of pipe controller 130 is an inversion of the write signal (FIG. 13E) appearing at the /WR_A output of controller 130. In a like manner, the latch signal appearing at the DATA_B_LATCH output of pipe controller 130 is an inversion of the latch signal (FIG. 13C) appearing at the DATA_A_LATCH output of pipe controller 130. The video data is illustrated in FIG. 13B.

Referring to FIGS. 6A, 6B, 6C, 10A and 10B, data compression circuit 22 includes a pair of identical data crunch circuits 138 and 140. Each circuit 138 and 140 includes a latch 240 for latching a sample of video data received from the analog to digital converter therein. Simultaneously, a latch 248 receives peak data from the static RAM holding peak data. The video data sample from latch 240 and the peak data from latch 248 are then supplied respectively to the A[7 . . . 0] input and the B[7 . . . 0] input of a magnitude comparator 242. Magnitude comparator 242 provides a test point signal A greater than B. When the AGTB output of magnitude comparator 242 is high then the video data is larger than the previously saved peak data.

The logic one from the AGTB output of magnitude comparator 242 is supplied through an OR gate 244 to the SEL input of 8×8 multiplexer 246. A high on the SEL input passes the video data from latch 240 through the multiplexer 246 and a tri-state buffer 266 to be written into the static RAM. A low on the SEL input passes the video data from latch 248 through the multiplexer 246 and a tri-state buffer 266 to be written into the static RAM.

Tri-state buffer 266 is enabled by the /RD signal of FIG. 13D being at the logic one state allowing data to pass through tri-state buffer 266 to the static RAM. When tri-state buffer 266 is disabled, (the /RD of FIG. 13D is low) video data read from the static RAM is latched into latch 248.

Data crunch circuits 138 and 140 also have an adder 250 which sums video data from latch 240 with video data from the static RAM storing average or summed data. Adder 250 is connected to a latch 252 which latches the data from the static RAM storing average or summed data.

FIG. 13F depicts peak A data in from the static RAM to data crunch circuit 138 and FIG. 13G depicts peak A data out from data crunch circuit 138 to the static RAM after a comparison has been made to determine whether the video data (FIG. 13B) in latch 240 or the peak data in (FIG. 13F) latch 248 has the larger value.

In a like manner, FIG. 13H depicts summed A data in from the static RAM to data crunch circuit 138 and FIG. 13I depicts summed A data out from data crunch circuit 138 to the static RAM after an addition of video data (FIG. 13A) to summed data (FIG. 13H) occurs within adder 250.

When the last scan occurs which is generally scan 64, the LAST_SCAN input to data crunch circuits 138 and 140 will receive a low to high transition which clocks a logic one to the Q output of Flip-Flop 258. A /RESET signal is then provided through the /RESET inputs of data crunch circuits 138 and 140 to an inverter 256 which inverts the /RESET signal resulting in a low to high transition at the clock input of Flip-Flop 260. This transition clocks the logic one at the D input of Flip-Flop 260 to its Q output which resets Flip-Flop 258. The high from the Q output of Flip-Flop 260 is supplied to OR gate 244 resulting in a logic one being supplied to the SEL input of 8×8 multiplexer 246. This logic one remains at the SEL input of multiplexer 246 for the entire scan resulting in 4000 samples of video data (FIG. 13B) from the analog to digital converter being written into the static RAM for peak data. This initializes the static RAM for peak data.

The logic one from the Q output of Flip-Flop 260 is also supplied to the SEL input of 8×8 multiplexer 268. This logic one remains at the SEL input of multiplexer 268 for an entire scan resulting in 4000 samples of video data (FIG. 13B) from the analog to digital converter being written into the static RAM for summed data. This initializes the static RAM for average or summed data.

For the last scan data from the SUM[15 . . . 0] output of adder 250 passes through the INT_ADDED[15 . . . 0] of data crunch circuits 138 and 140 to a data combine circuit 144 (FIG. 6C) prior to being written into the dual port RAM. Further, for the last scan, the peak data to be provided to combine circuit 144 will be the peak data from the static RAM as depicted in FIG. 13F or the video data (FIG. 13B). When, for example, the SEL input of 8×8 multiplexer 264 is high, the video data (FIG. 13B) will be supplied through the INT_PEAK[7 . . . 0] output of data crunch circuits 138 and 140 to the combine circuit 264. The last scan data is the result of the compression of 4000 samples of peak data and 4000 samples of average data for the sixty four scans that occur during the compression of the data by data compression circuit 22.

Referring to FIGS. 6A, 6B and 6C, data compression circuit 22 receives a single detection bit at its DETECTION_GATE input. This detection bit is delayed by four clock cycles by a four bit delay circuit 132. The four bit delay circuit 132 comprises four Flip-Flops. The reason for the four clock cycle delay is to compensate for the four clock cycle delay in the digital to analog converter.

Referring to FIGS. 6A, 6B, 6C, data compression circuit 22 includes an output control circuit 136 which generates a window for the compressed video data resulting from the last scan. The STROBE input of output control circuit 136 receives the strobe signal from the frame controller 20. The strobe signal occurs 124 bytes before the frame sync signal of FIG. 12F.

At this time it should be noted that a missile's seeker provides signals to the digital circuit of FIG. 1. These signals are the video data, the detection bit signal and the master trigger signal which indicates the start of each scan. The strobe signal, which is a single pulse, opens a window for the last scan. The window is 124 bytes in length to allow the compressed video data resulting from the last scan to be written into the dual port RAM.

Figure 11A:
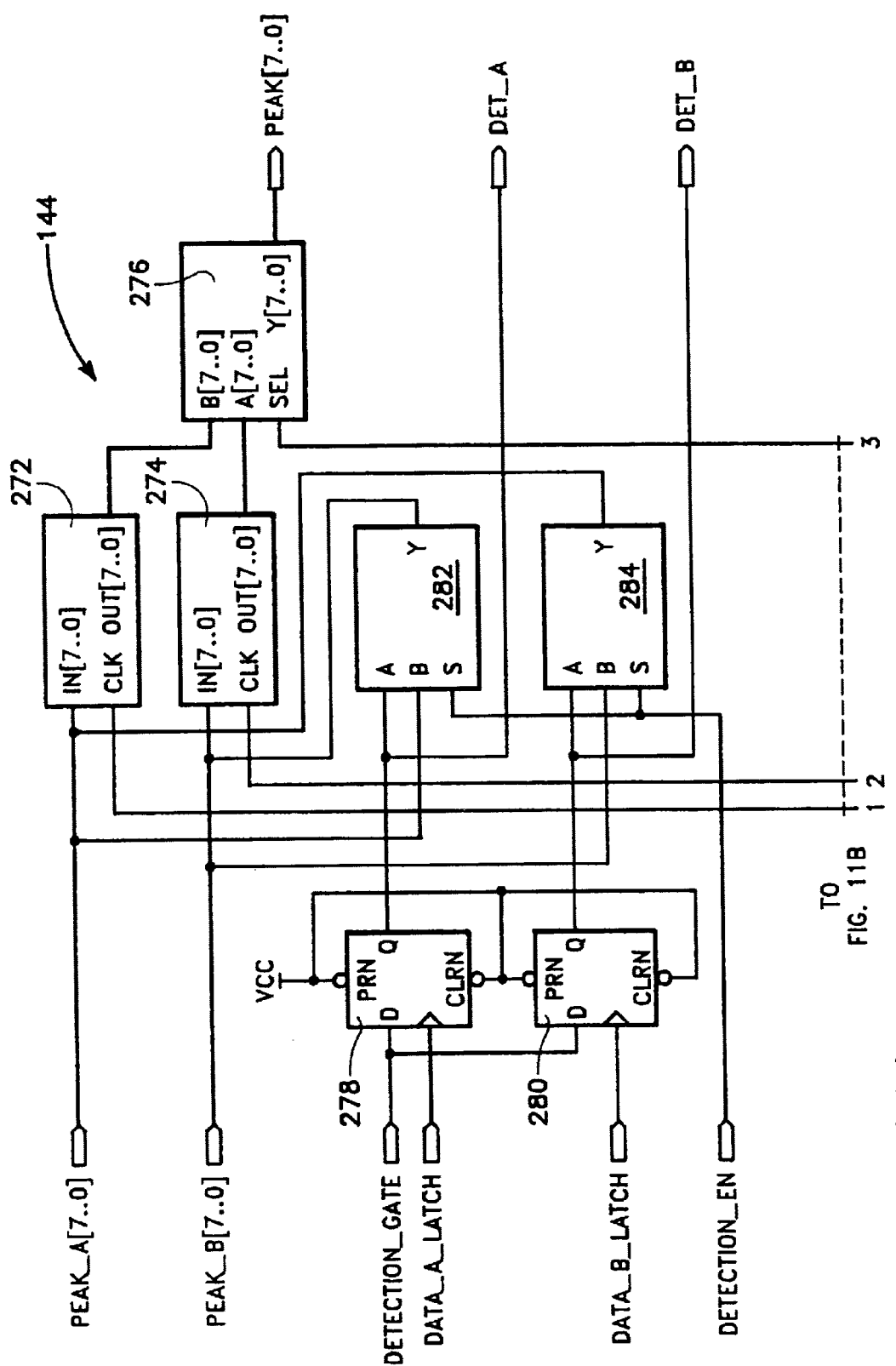
FIGS. 11A–11B is a detailed logic diagram of the data combiner circuit for the data compression circuit of FIG. 6B.
Figure 11B:
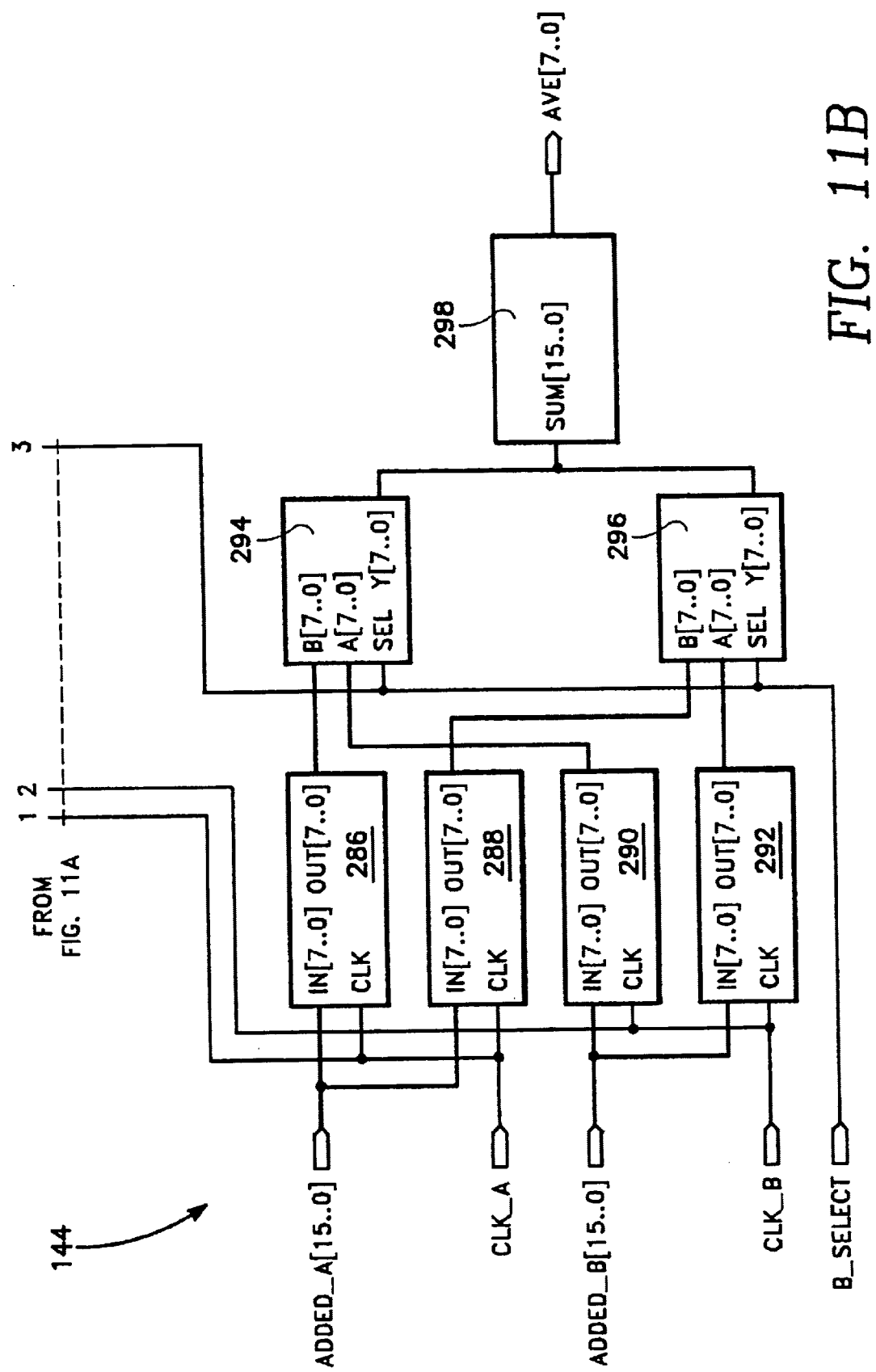

The /WR_A signal of FIG. 13E and the /WR_B signal are also supplied to the output control circuit 136. The outputs of output control circuit 136 include a CLK_A and CLK_B signal which are latching signals for latching the final computed value of the A data and the B data into respectively latches 272, 274, 286, 288, 290 and 292 within combine circuit 144 (FIG. 11B). The /WR_DPR signal of FIG. 13M an active low signal which is the write signal to the dual port RAM. The low to high transition of the /WR_DPR signal of FIG. 13M is a signal to increment the address to the dual port RAM as is best illustrated in FIG. 13N. There is a signal /RESET_DPR_ADDR which goes active at the end of the last byte that is written into the dual port RAM which resets the address counter 142 for the dual port RAM.

It should be noted that the dual port RAMs receive 4000 samples of compressed video data from the data compression circuit 22 of the digital circuit of FIG. 1. The compressed video data is generated as the result of compressing 64 scans of video data with a peak value and an average value being provided by the data compression circuit 22 of the digital circuit of FIG. 1.

Address counter 142 increments to a count of 4000 and then is reset by the /RESET_DPR_ADDR signal provided by output control circuit 136. The count is from address zero to count 3999.

Referring to FIGS. 6A, 6B, 6C and 9, FIG. 9 illustrates the scan counter 134 for the data compression circuit 22. The scan count is generally sixty four. However, the scan counter 134 may count sixty three or sixty five scans.

The MASTER_TRIGGER signal is provided to the MASTER_TRIGGER input of scan counter 134 and then inverted by an inverter 230 before being supplied to the CLK input of counters 232 and 234. The inverted MASTER_TRIGGER signal increments counters 232 and 234. Counter 232 provides the least significant bits of an eight bit count, while counter 234 provides the most significant bits of the eight bit count.

The strobe signal from the frame controller 20 is supplied to the STROBE input of scan counter 134. The strobe signal clocks a logic one through Flip-Flop 220 to the D input of Flip-Flop 222. The rising edge of the MASTER_TRIGGER signal clocks the logic through Flip-Flop 222 to an inverter 224 which inverts the logic one to a logic zero. The logic zero is supplied to the LDN inputs of counters 232 and 234 for loading preset count of one into counters 232 and 234. The scan count appearing at the COUNT[7 . . . 0] output of scan counter 134 is supplied to frame controller 20. The scan count is transmitted out in the PCM data stream just prior to the video data being transmitted out for every subframe.

Referring to FIGS. 6A, 6B, 6C, 11A and 11B, during the last scan peak data and summed data are supplied to data combine circuit 144. Alternately, sample zero of the peak data is supplied from data crunch circuit 138 to the PEAK_A[7 . . . 0] input of data combine circuit 144 and latched into latch 272 by the CLK_A signal, followed by sample one of the peak data which is supplied from data crunch circuit 140 to the PEAK_B[7 . . . 0] input of data combine circuit 144 and latched into latch 274 by the CLK_B signal. This pattern continues for samples 2 through 3999 of the peak data which are alternately supplied to the PEAK_A[7 . . . 0] input and the PEAK_B[7 . . . 0] input of data combine circuit 144 The summed video data is processed in exactly the same manner with added A data (samples 0, 2, 4 . . . ) being latched into latches 286 and 288 by the CLK_A signal and added B data (sample 1, 3, 5 . . . ) being latched into latches 290 and 292 by the CLK_B signal.

Data selector 276, which is an 8×8 multiplexer, receives a B_SELECT signal at its SEL input which when high passes data from its A[7 . . . 0] input to its Y[7 . . . 0] output. A low at the SEL input of data selector 276 passes data from its B[7 . . . 0] input to its Y[7 . . . 0] output. The B_SELECT signal is the least significant bit of the address signal to the dual port RAM.

Data selector 276 insures that the peak data is sequential, that is the sequence of peak data is samples 0, 1, 2, 3 . . . 3999.

Added data is processed in exactly the same manner by the combination of latches 286, 288, 290 and 292 and data selectors 294 and 296 which are 8×8 multiplexers. Again data selectors 294 and 296 insure that the summed data is sequential, that is the sequence of summed data is samples 0, 1, 2, 3 . . . 3999.

The 16 bits of the summed data from data selectors 294 and 296 are supplied to a divider 298 which is a divide by 64 circuit. Divider 298 converts the summed data to average data by dividing by sixty four. Divider 298 performs a binary divide by shifting the data six places to the right. Eight data lines are selected with the six least significant bits being discarded and the next eight bits being written to the dual port RAM. The selected bits to be written to the dual port RAM are six, seven, eight, nine, ten, eleven, twelve and thirteen.

When the DETECTION_EN input of data combine circuit 144 is high, data selectors 282 and 284 are set such the A input of data selectors 282 and 284 is connected to the Y output of selectors 282 and 284. The detection bit is latched into latches 278 and 280 which respectively have their Q outputs connected to the A inputs of data selectors 282 and 284. The detection bit then replaces the least significant bit of the peak data provided to the dual port RAM.

What is claimed is:

1. A digital circuit for compressing and formatting video data from a seeker on board a missile, said digital circuit comprising:
  (a) frame controlling means for receiving said video data from an external memory and a scan count and providing a frame of said video data which includes said scan count, non video data and compressed video data, said frame controlling means including:
    (i) frame formatting means for receiving a first clock signal, said frame formatting means, responsive to said first clock signal, generating said non video data, a video enable signal, a video load signal, a video select signal, a frame sync signal and a frame strobe signal;
    (ii) multiplexing means for receiving said video select signal, said multiplexing means receiving said compressed video data from said external memory and said scan count, said multiplexing means passing said compressed video data through said multiplexing means when said video select signal is at a first logic state and said multiplexing means passing said scan count through said multiplexing means when said video select signal is at a second logic state;
    (iii) converting means for receiving said compressed video data, said scan count and said video load signal, said converting means receiving said first clock signal, said converting means, responsive to said first clock signal and said video load signal, converting said compressed video data and said scan count from a parallel data format to a serial data format;
    (iv) first logic gate means for receiving said compressed video data and said scan count, said first logic gate receiving said video enable signal, said first logic gate means passing said non video data through said first logic gate means when said video enable signal is at a first logic state and said first logic gate means passing said compressed video data and said scan count through said first logic gate means when said video enable signal is at a second logic state;
    (v) second logic gate means for receiving said video enable signal, said frame sync signal and said video load signal, said second logic gate means processing said video enable signal, said frame sync signal and said video load signal to generate a read signal, a second clock signal, and a pair of chip select signals which allows for a transfer of said compressed video data from said external memory to said frame controlling means;
    (vi) address generating means for receiving said second clock signal, said address generating means, responsive to said second clock signal, generating a first plurality of addresses to effect said transfer of said video data from said external memory to said frame controlling means; and (vii) synchronizing means for receiving said non video data, said compressed video data and said scan count, said synchronizing means receiving said first clock signal, said synchronizing means having said non video data, said video data and said scan count clocked through said synchronizing means by said first clock signal providing at an output of said synchronizing means said frame of video data which is synchronized with said first clock signal; and (b) data compressing means for receiving a plurality of scans of said video data and a master trigger signal from said seeker, said data compressing means receiving said frame strobe signal from said frame formatting means, said data compressing means receiving a third clock signal, said data compressing means, responsive to said frame strobe signal, said master trigger signal and said third clock signal, compressing said plurality of scans of said video data into said compressed video data which includes peak value video data and average value video data;

said data compressing means generating a write signal and a second plurality of addresses to effect a storage of said compressed video data into said external memory allowing said frame formatting means to effect said transfer of said compressed video data from said external memory to said frame controlling means; and said data compressing means generating said scan count, said data compressing means providing said scan count to said frame formatting means.

2. The digital circuit of claim 1 wherein said converting means comprises an eight bit parallel to serial shift register.

3. The digital circuit of claim 1 wherein said first logic gate means comprises:

an OR gate having a first input to said frame formatting means to receive said non video data, a second input and an output connected to said synchronizing means; and an AND gate having a first input connected to said frame formatting means to receive said video enable signal, a second input connected to said converting means to receive said video data and said scan count and an output connected to the second input of said OR gate.

4. The digital circuit of claim 1 wherein said second logic gate comprises:

a first inverter having an input connected to said frame formatting means to receive said frame sync signal and an output;

a second inverter having an input connected to said frame formatting means to receive said video enable signal and an output;

a first OR gate having a first input connected to said frame formatting to receive said video load signal, a second input connected to the output of said second inverter and an output;

a D Flip-Flop having a clock data input connected to the output of said first OR gate, a clear input connected to the output of said first inverter, a data input and a Q output;

a third inverter having an input connected to the Q output of said D Flip-Flop and an output connected to the data input of said Flip-Flop;

a second OR gate having a first input connected to said frame formatting means to receive said video load signal, a second input connected to the output of said second inverter and an output for providing said read signal;

a third OR gate having a first input connected to the Q output of said D Flip-Flop, a second input connected to the output of said second inverter and an output for providing a first of said pair of chip select signals;

a fourth inverter having an input connected to the Q output of said D Flip-Flop and an output; and a fourth OR gate having a first input connected to the output of said fourth inverter, a second input connected to the output of said second inverter and an output for providing a second of said pair of chip select signals.

5. The digital circuit of claim 1 wherein said synchronizing means comprises a D Flip-Flop.

6. The digital circuit of claim 1 wherein said frame formatting means includes word generating means for generating said video enable signal, said video load signal, said video select signal, said frame sync signal and said frame strobe signal.

7. The digital circuit of claim 6 wherein said word generating means comprises:

a first inverter having an input for receiving a SUBFRAME_CY signal and an output;

a first AND gate having a first input connected to the output of said first inverter, a second input and an output;

a first OR gate having a first input connected to the output of said first AND gate, a second input for receiving a NON_VIDEO_CY signal and an output;

a first D Flip-Flop having a data input connected to the output of said first OR gate, a clock input for receiving said first clock signal and a Q output;

a second inverter having an input connected to the output of said first D Flip-Flop and an output;

a second AND gate having a first input connected to the output of said second inverter, a second input for receiving a WORD_CY signal and an output;

a second OR gate having a first input connected to the output of said second AND gate, a second input for receiving said SUBFRAME_CY signal and an output for providing a NON_VIDEO_INC signal;

a second D Flip-Flop having a data input connected to the Q output of said first D Flip-Flop, a clock input for receiving said first clock signal and a Q output for providing said video enable signal;

a third AND gate having a first input for receiving said WORD_CY signal, a second input connected to the Q output of said first D Flip-Flop, a third input connected to the output of said first inverter and an output;

a NOR gate having a first input connected to the output of said third AND gate, a second input for receiving said NON_VIDEO_CY signal and an output;

a third D Flip-Flop having a data input connected to the output of said NOR gate, a clock input for receiving said first clock signal and a Q output for providing said video load signal;

a third inverter having an input for receiving said NON_VIDEO_CY signal and an output;

a fourth D Flip-Flop having a data input connected to the output of said third inverter, a clock input for receiving said first clock signal and a Q output for providing said video select signal;

a fifth D Flip-Flop having a data input for receiving a FRAME_CY signal, a clock input for receiving said first clock signal and a Q output for providing said frame sync signal;

a frame strobe generator having a word input for receiving a fifteen bit word count of 111 1111 1000 0011, a word sync input for receiving said WORD_CY signal and an output;

a sixth D Flip-Flop having a data input connected to the output of said frame strobe generator, a clock input for receiving said first clock signal and a Q output for providing said frame strobe signal; and a seventh D Flip-Flop having a data input for receiving said SUBFRAME_CY signal, a clock input for receiving said first clock signal and a Q output for providing a NON_VIDEO_LOAD signal.

8. The digital circuit of claim 7 wherein said frame strobe generator comprises:

a first eight input AND gate having a first input for receiving said WORD_CY signal, a second input for receiving a first bit of said fifteen bit word count, a third input for receiving a second bit of said fifteen bit word count, a fourth input, a fifth input, a sixth input, a seventh input, an eighth input and an output;

a plurality of inverters for receiving and inverting third, fourth, fifth, sixth and seventh bits of said fifteen bit word count which are provided respectively to the fourth, fifth, sixth, seventh and eighth inputs of said first eight input AND gate;

a second eight input AND gate having first, second, third, fourth, fifth, sixth, seventh and eighth inputs for respectively receiving an eighth bit, a ninth bit, a tenth bit, an eleventh bit, a twelfth bit, a thirteenth bit, a fourteenth bit and a fifteenth bit of said fifteen bit word count and an output; and a two input AND gate having a first input connected to the output of said first eight input AND gate, a second input connected to the output of said second eight input AND gate and an output connected to the D input of said sixth D Flip-Flop.

9. The digital circuit of claim 1 wherein said frame formatter includes first, second and third eight bit parallel to serial shift registers for generating a frame sync pattern having first, second and third eight bit words comprising respectively 11111010, 11110011 and 00100000.

10. The digital circuit of claim 1 wherein said frame of video data includes alternatively approximately 4000 eight bit words of said peak value video data and approximately 4000 eight bit words said average value video data.

11. A digital circuit for compressing and formatting video data from a seeker on board a missile, said digital circuit comprising:

(a) a frame controller for receiving said video data from an external memory and a scan count and providing a frame of said video data which includes said scan count, non video data and compressed video data, said frame controller including:

(i) a frame formatter for receiving a first clock signal, said frame formatter, responsive to said first clock signal, generating said non video data, a video enable signal, a video load signal, a video select signal, a frame sync signal and a frame strobe signal;

(ii) a multiplexer connected to said frame formatter to receive said video select signal, said multiplexer receiving said compressed video data from said external memory and said scan count, said multiplexer passing said compressed video data through said multiplexer when said video select signal is at a first logic state and said multiplexer passing said scan count through said multiplexer when said video select signal is at a second logic state;

(iii) a parallel to serial shift register connected to said multiplexer and said frame formatter to receive said compressed video data, said scan count and said video load signal, said parallel to serial shift register receiving said first clock signal, said parallel to serial shift, responsive to said first clock signal and said video load signal, converting said compressed video data and said scan count from a parallel data format to a serial data format;

(iv) a first logic gate connected to said parallel to serial shift register to receive said compressed video data and said scan count, said first logic gate being connected to said frame formatter to receive said video enable signal, said first logic gate passing said non video data through said first logic gate when said video enable signal is at a first logic state and said first logic gate passing said compressed video data and said scan count through said first logic gate when said video enable signal is at a second logic state;

(v) a second logic gate connected to said frame formatter to receive said video enable signal, said frame sync signal and said video load signal, said second logic gate processing said video enable signal, said frame sync signal and said video load signal to generate a read signal, a second clock signal, and a pair of chip select signals which allows for a transfer of said compressed video data from said external memory to said frame controller;

(vi) an address counter connected to said second logic gate to receive said clock signal, said address counter, responsive to said clock signal, generating a first plurality of addresses to effect said transfer of said video data from said external memory to said frame controller; and (vii) a Flip-Flop having a data input connected to said first logic gate to receive said non video data, said compressed video data and said scan count, said Flip-Flop having a clock input for receiving said first clock signal, said Flip-Flop having said non video data, said video data and said scan count clocked through said Flip-Flop by said first clock signal providing at an output of said Flip-Flop said frame of video data which is synchronized with said first clock signal; and (b) a data compression circuit for receiving a plurality of scans of said video data and a master trigger signal from said seeker, said data compression circuit being connected to said frame formatter to receive said frame strobe signal, said data compression circuit receiving a third clock signal, said data compression circuit, responsive to said frame strobe signal, said master trigger signal and said third clock signal, compressing said plurality of scans of said video data into said compressed video data which includes peak value video data and average value video data;

said data compression circuit generating a write signal and a second plurality of addresses to effect a storage of said compressed video data into said external memory allowing said frame formatter to effect said transfer of said compressed video data from said external memory to said frame controller; and said data compression circuit generating said scan count, said data compression circuit providing said scan count to said frame formatter.

12. The digital circuit of claim 11 wherein said first logic gate comprises:
  an OR gate having a first input to said frame formatter to receive said non video data, a second input and an output connected to said Flip-Flop; and
  an AND gate having a first input connected to said frame formatter to receive said video enable signal, a second input connected to said parallel to serial shift register to receive said video data and said scan count and an output connected to the second input of said OR gate.

13. The digital circuit of claim 11 wherein said second logic gate comprises:
  a first inverter having an input connected to said frame formatter to receive said frame sync signal and an output;
  a second inverter having an input connected to said frame formatter to receive said video enable signal and an output;
  a first OR gate having a first input connected to said frame formatter to receive said video load signal, a second input connected to the output of said second inverter and an output;
  a D Flip-Flop having a clock data input connected to the output of said first OR gate, a clear input connected to the output of said first inverter, a data input and a Q output;
  a third inverter having an input connected to the Q output of said D Flip-Flop and an output connected to the data input of said Flip-Flop;
  a second OR gate having a first input connected to said frame formatter to receive said video load signal, a second input connected to the output of said second inverter and an output for providing said read signal;
  a third OR gate having a first input connected to the Q output of said D Flip-Flop, a second input connected to the output of said second inverter and an output for providing a first of said pair of chip select signals;
  a fourth inverter having an input connected to the Q output of said D Flip-Flop and an output; and
  a fourth OR gate having a first input connected to the output of said fourth inverter, a second input connected to the output of said second inverter and an output for providing a second of said pair of chip select signals.

14. The digital circuit of claim 11 wherein said Flip-Flop comprises a D Flip-Flop.

15. The digital circuit of claim 11 wherein said frame formatter includes a word select circuit for generating said video enable signal, said video load signal, said video select signal, said frame sync signal and said frame strobe signal.

16. The digital circuit of claim 15 wherein said word select circuit comprises:
  a first inverter having an input for receiving a SUBFRAME_CY signal and an output;
  a first AND gate having a first input connected to the output of said first inverter, a second input and an output;
  a first OR gate having a first input connected to the output of said first AND gate, a second input for receiving a NON_VIDEO_CY signal and an output;
  a first D Flip-Flop having a data input connected to the output of said first OR gate, a clock input for receiving said first clock signal and a Q output;
  a second inverter having an input connected to the output of said first D Flip-Flop and an output;
  a second AND gate having a first input connected to the output of said second inverter, a second input for receiving a WORD_CY signal and an output;
  a second OR gate having a first input connected to the output of said second AND gate, a second input for receiving said SUBFRAME_CY signal and an output for providing a NON_VIDEO_INC signal;
  a second D Flip-Flop having a data input connected to the Q output of said first D Flip-Flop, a clock input for receiving said first clock signal and a Q output for providing said video enable signal;
  a third AND gate having a first input for receiving said WORD_CY signal, a second input connected to the Q output of said first D Flip-Flop, a third input connected to the output of said first inverter and an output;
  a NOR gate having a first input connected to the output of said third AND gate, a second input for receiving said NON_VIDEO_CY signal and an output;
  a third D Flip-Flop having a data input connected to the output of said NOR gate, a clock input for receiving said first clock signal and a Q output for providing said video load signal;
  a third inverter having an input for receiving said NON_VIDEO_CY signal and an output;
  a fourth D Flip-Flop having a data input connected to the output of said third inverter, a clock input for receiving said first clock signal and a Q output for providing said video select signal;
  a fifth D Flip-Flop having a data input for receiving a FRAME_CY signal, a clock input for receiving said first clock signal and a Q output for providing said frame sync signal;
  a frame strobe generator having a word input for receiving a fifteen bit word count of 111 1111 1000 0011, a word sync input for receiving said WORD_CY signal and an output;
  a sixth D Flip-Flop having a data input connected to the output of said frame strobe generator, a clock input for receiving said first clock signal and a Q output for providing said frame strobe signal; and
  a seventh D Flip-Flop having a data input for receiving said SUBFRAME_CY signal, a clock input for receiving said first clock signal and a Q output for providing a NON_VIDEO_LOAD signal.

17. The digital circuit of claim 16 wherein said frame strobe generator comprises:
  a first eight input AND gate having a first input for receiving said WORD_CY signal, a second input for receiving a first bit of said fifteen bit word count, a third input for receiving a second bit of said fifteen bit word count, a fourth input, a fifth input, a sixth input, a seventh input, an eighth input and an output;
  a plurality of inverters for receiving and inverting third, fourth, fifth, sixth and seventh bits of said fifteen bit word count which are provided respectively to the fourth, fifth, sixth, seventh and eighth inputs of said first eight input AND gate;
  a second eight input AND gate having first, second, third, fourth, fifth, sixth, seventh and eighth inputs for respectively receiving an eighth bit, a ninth bit, a tenth bit, an eleventh bit, a twelfth bit, a thirteenth bit, a fourteenth bit and a fifteenth bit of said fifteen bit word count and an output; and
  a two input AND gate having a first input connected to the output of said first eight input AND gate, a second input connected to the output of said second eight input AND gate and an output connected to the D input of said sixth D Flip-Flop.

18. The digital circuit of claim 11 wherein said frame formatter includes first, second and third eight bit parallel to serial shift registers for generating a frame sync pattern having first, second and third eight bit words comprising respectively 11111010, 11110011 and 00100000.

19. The digital circuit of claim 11 wherein said frame of video data includes alternatively approximately 4000 eight bit words of said peak value video data and approximately 4000 eight bit words of said average value video data.

20. The digital circuit of claim 11 wherein said non video data comprises three eight bit words of frame synch data, an eight bit word of sub-frame identification data and an eight bit word of frame count data, said digital circuit providing said non video data at the beginning of each of eight subframes included in said frame of video data.

* * * * *